United States Patent [19]
Yoshioka et al.

[11] Patent Number: 5,553,216
[45] Date of Patent: Sep. 3, 1996

[54] STRUCTURED DATABASE SYSTEM TOGETHER WITH STRUCTURE DEFINITION FRAME STORING DOCUMENT BODY DATA

[75] Inventors: Makoto Yoshioka; Hiroaki Negishi; Gengo Tazaki; John W. Mackin; Mitsuhiro Kokubun, all of Kawasaki, Japan

[73] Assignee: Fujitsu Limited, Kawasaki, Japan

[21] Appl. No.: 202,193

[22] Filed: Feb. 24, 1994

[30] Foreign Application Priority Data

Feb. 26, 1993 [JP] Japan ................................. 5-038715

[51] Int. Cl.⁶ .................................................. G06F 17/30
[52] U.S. Cl. ........................... 395/145; 395/146; 395/147; 395/148; 395/600
[58] Field of Search ...................... 364/419.14, 419.17, 364/419.19; 395/600, 145, 146, 147, 148

[56] References Cited

U.S. PATENT DOCUMENTS

| | | | |
|---|---|---|---|
| 4,713,754 | 12/1987 | Agarwal et al. | 395/600 |
| 4,959,769 | 9/1990 | Cooper et al. | 395/600 |
| 4,996,662 | 2/1991 | Cooper et al. | 395/600 |
| 5,119,491 | 6/1992 | Iwai et al. | 395/600 |
| 5,130,924 | 7/1992 | Barker et al. | 364/419.1 |
| 5,181,162 | 1/1993 | Smith et al. | 364/419.19 |
| 5,276,793 | 1/1994 | Borgendale et al. | 395/148 |
| 5,323,312 | 6/1994 | Saito et al. | 364/419.1 |
| 5,434,962 | 7/1995 | Kyojima et al. | 395/145 |
| 5,438,512 | 8/1995 | Mantha et al. | 364/419.1 |

FOREIGN PATENT DOCUMENTS

| | | |
|---|---|---|
| 60-024622 | 2/1985 | Japan . |
| 2-297178 | 12/1990 | Japan . |
| 3-208141 | 9/1991 | Japan . |
| 4-175966 | 6/1992 | Japan . |
| 4-340167 | 11/1992 | Japan . |

*Primary Examiner*—Ken S. Kim
*Attorney, Agent, or Firm*—Staas & Halsey

[57] ABSTRACT

A structured database system includes a first unit for obtaining a structure definition frame of a document showing a structure of the document, and a second unit for storing body data of the document in a database together with the structure definition frame.

15 Claims, 32 Drawing Sheets

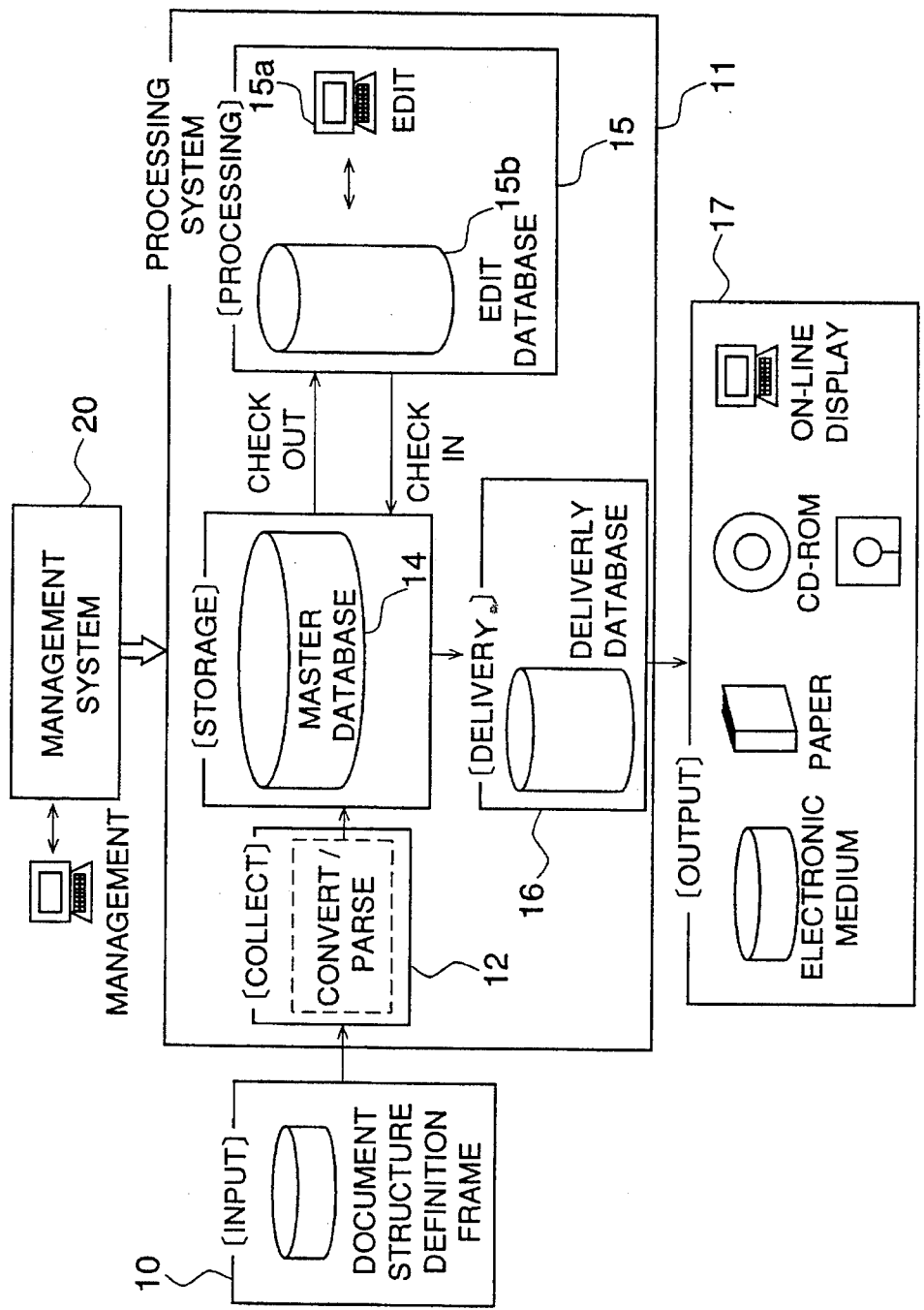

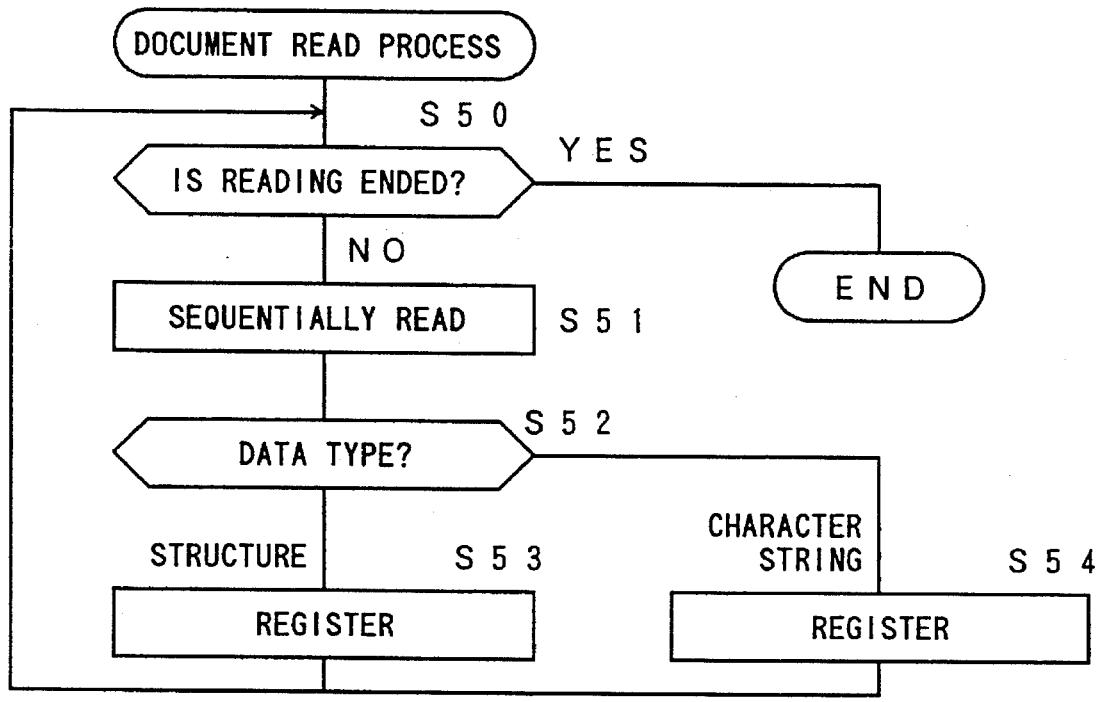
F I G. 16

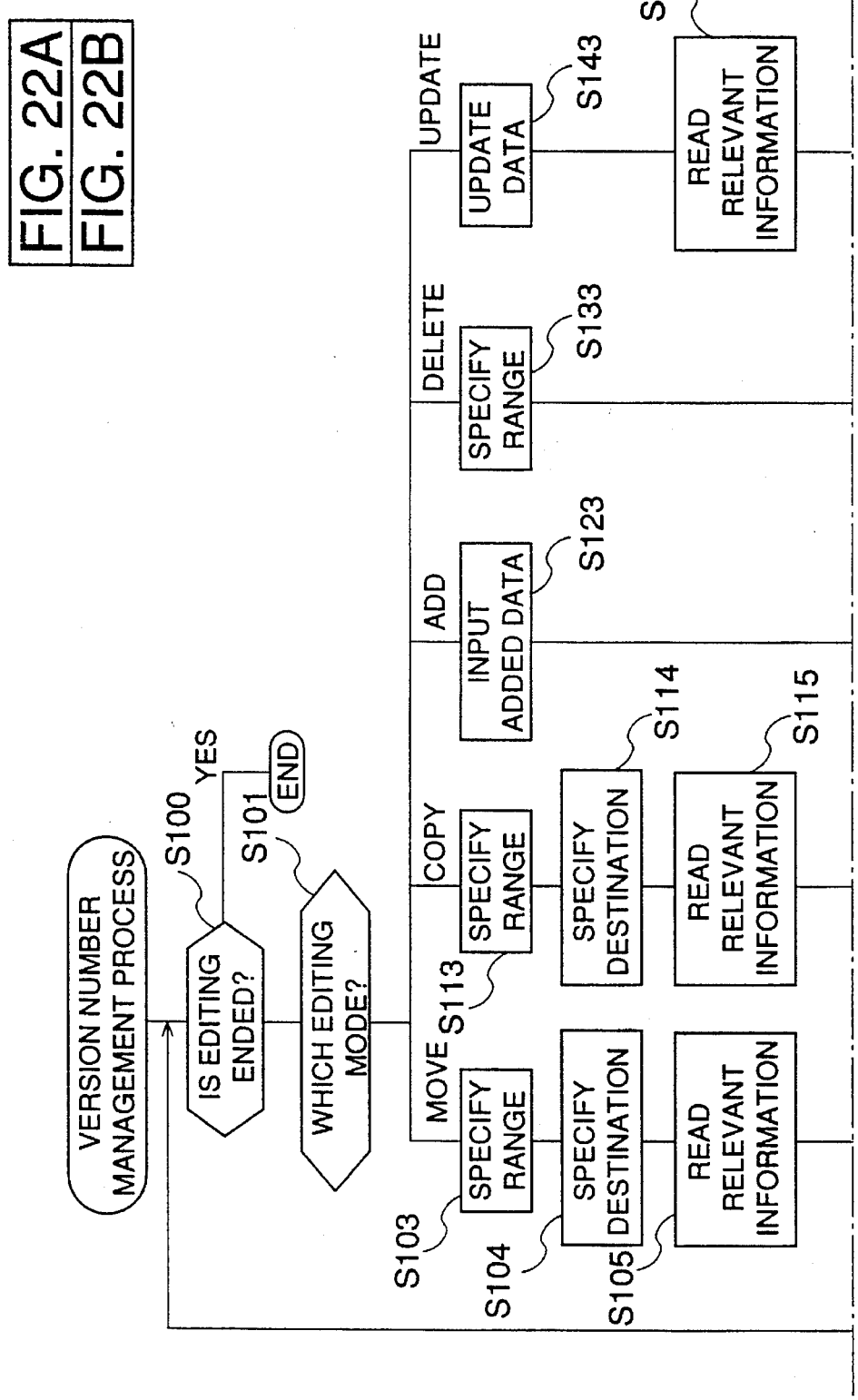

| FIG. 28A |
| FIG. 28B |

STRUCTURED DATABASE SYSTEM TOGETHER WITH STRUCTURE DEFINITION FRAME STORING DOCUMENT BODY DATA

BACKGROUND OF THE INVENTION

1. Field of the Invention

The present invention generally relates to structured database systems, and more particularly to a structured database system that uses structured information in documents to manage the documents. In general, information in documents is innately structured. For example, documents having such structured information are documents used in the activities of companies, such as drawings and specifications.

2. Description of the Prior Art

Generally, information in documents has a tree structure as shown in FIGS. 1A and 1B. FIG. 1B schematically shows the tree structure shown in FIG. 1A. Information in documents is structured in terms of structural units or elements such as a group of documents, documents, chapters, sections and paragraphs. The tree structure of a document may be dynamically changed. For example, the tree structure may be expanded by adding a new unit after an existing unit of tree structure or grouping a number of existing units. For example, items are defined in paragraphs, drawings and tables, and are then collected to form a group that follows an existing section.

The structured database handles electronic information of structured documents. The electronic information of documents can be in the form of text data, graphic data (image data and vector data), source code (normally character data), the internal code (normally vector data) of a CAD (Computer Assisted Design) system and so on.

Conventionally, a word processor, a DTP (Desk Top Publishing) system, a CAP (Computer Assisted Publishing) system, and a CAD system are known as devices for creating and managing the electronic data of documents. Further, existing database systems such as an RDB (Relational DataBase), can be used to store and manage documents.

The devices as mentioned above are classified into two types; a first type in which a document is handled as groups of symbols such as characters, control symbols, graphic symbols, or a second type in which a mark called "tag" is added to elements in a document. The devices of the first type handle a document as simple data and therefore have a difficulty in management and reuse of the information structure. For example, it is necessary to perform information retrieval in order to know specific information in a specific document or the history of modified portions. Generally, it is very difficult to correctly obtain all of necessary information by means of the information retrieval for the above-mentioned purpose. Even in a case where the document management table electronically cooperates with documents, it is only possible to retrieve a storage area in which the target document is stored, and it is impossible to correctly obtain necessary information from the target document unless the operator actually sees the contents of the documents.

The devices of the second type are capable of performing management based on the structures of documents. However, the devices of the second type still handle files with documents as groups of blocks of data independent of the structures of the documents, and hence need a particular mechanism like the document management table in order to perform development, management and reuse of documents (including groups of documents mutually associated) and to perform information retrieval. The above particular mechanism is not directly related to information bodies themselves as in the case of use of papers. Hence, the devices of the second type do not have sufficient efficiency and reliability in information retrieval and so on.

The existing database systems have structures that are optimized for specific operations and do not have the functions of efficiently and effectively supporting the document structures. Hence, the existing database systems have the following disadvantages, particularly, regarding the way that database systems are used.

When a document is stored and managed in an existing database system, the document may be arranged on the basis of the structure thereof. For example, when a document is stored in the RDB system, the document is required to be arranged and stored in the form of a table.

On the other hand, if an existing database system is modified in order to match the structure of a document to be stored and managed, some definitions which were not originally prepared may be defined in the existing database system. For example, it is required to define a pointer for accessing a file and/or a free field for each field of the RDB system. Such an additional definition in the existing database system may degrade the original performance thereof, particularly regarding the efficiency in information retrieval and storage capacity. In some cases, the additional definition may prevent use of the original accessing method, such as a standard query language for the RDB system. Such a problem further degrades the efficiency in accessing the database and sometimes requires a particular remedy, i.e., program, for access.

The structure of documents is flexible. For example, the structural units or elements of documents, such as the numbers of chapters and sections are variable, and the document structure expanded. Normally, the structure definition (schema definition) of the existing database systems is determined before data is actually stored. Hence, it is very troublesome to modify the structure of the active database system when in use. When the active database system is modified, a data backup process will be needed, and the saved data may be required to be loaded into the system again after the modification is complete in order to match the saved data with the modified database structure.

It is required that the database system always stores the latest information regarding documents. When a document is revised, a revised version or edition of the document is issued. In some cases, it will be required to save not only the revised version but also the previous versions made in the past. Hence, it is necessary to efficiently manage documents having a number of versions.

The conventional database systems are easily capable of managing the latest version but need to save the previous versions independent of the latest version. In this case, a particular mechanism such as a register system is needed to manage the correspondence among the latest version and the previous versions. Hence, it is necessary to save all the versions and manage and update the correspondence among the versions.

However, it is practically impossible to manage the correspondence among the versions by means of the register mechanism. For example, if there is a need to reflect an error found in a version to the other versions, it will be very difficult to efficiently access such an error in each of the other versions. Further, there is a possibility that the above error may not be completely corrected in some other versions.

In some cases, a document is required to be written in a number of languages. When a document written in a particular language is developed or modified, the other versions written into the other languages must be developed or modified, so as to have the same contents as those of the document originally developed or modified, for each of the structural units such as chapters, sections and paragraphs. For example, when a Japanese document is translated into English, information inherent in Japanese may be omitted or one paragraph may be divided into a number of parts such as paragraphs. In this case, the information elements of the Japanese document and those of the English translation do not have a direct one-to-one correspondence. Even in this case, the correspondence between the Japanese document and the English version thereof is needed to be managed for each information element.

Further, in a case where either the Japanese or the English version is modified, it may be very troublesome to modify the other version even if the relevant portions in the version to be modified are easily identified. If the Japanese version is greatly modified, it may be required to translate the modified Japanese version again in order to prepare the English version perfectly corresponding to the modified Japanese version.

It will be noted that the contents of documents in the form of paper can be easily seen while documents stored as electronic information cannot be directly seen. In the form of paper, the location of information can be seen and information retrieval can be facilitated. However, such useful information is not available in electrically converted information. As the amount of information electrically stored increases, more useful tools, such as a table of contents and indexes are required to facilitate information retrieval in addition to improvements in the structure of the database system.

SUMMARY OF THE INVENTION

It is an object of the present invention to provide a structured database system capable of performing retrieval at high speeds and in accordance with the document structures.

The above object of the present invention is achieved by a structured database system comprising: first means for obtaining a structure definition frame of a document showing a structure of the document; and second means for storing body data of the document in a database together with the structure definition frame.

BRIEF DESCRIPTION OF THE DRAWINGS

Other objects, features and advantages of the present invention will become more apparent from the following detailed description when read in conjunction with the accompanying drawings, in which:

FIG. 2 is a block diagram of a structured database system according to an embodiment of the present invention;

FIG. 16 is a flowchart of a read process executed by the editing device shown in FIG. 15;

FIG. 22 is a block diagram showing how FIGS. 22A and 22B are combined together;

FIGS. 22A and 22B together are flowcharts of a version number management process executed by the editing device shown in FIG. 15;

FIGS. 28A and 28B together are flowcharts of an index creating process executed by the editing device shown in FIG. 15.

DESCRIPTION OF THE PREFERABLE EMBODIMENTS

FIG. 2 is a block diagram of a structured database system according to an embodiment of the present invention, A document converted into electronic information by an input unit 10 is converted into structural data and body data according to the structure of the above document by means of a collecting unit 12 of a processing system 11. The converted structural data and the main body data are stored in a database 14 functioning as a storage medium.

Figure 3:
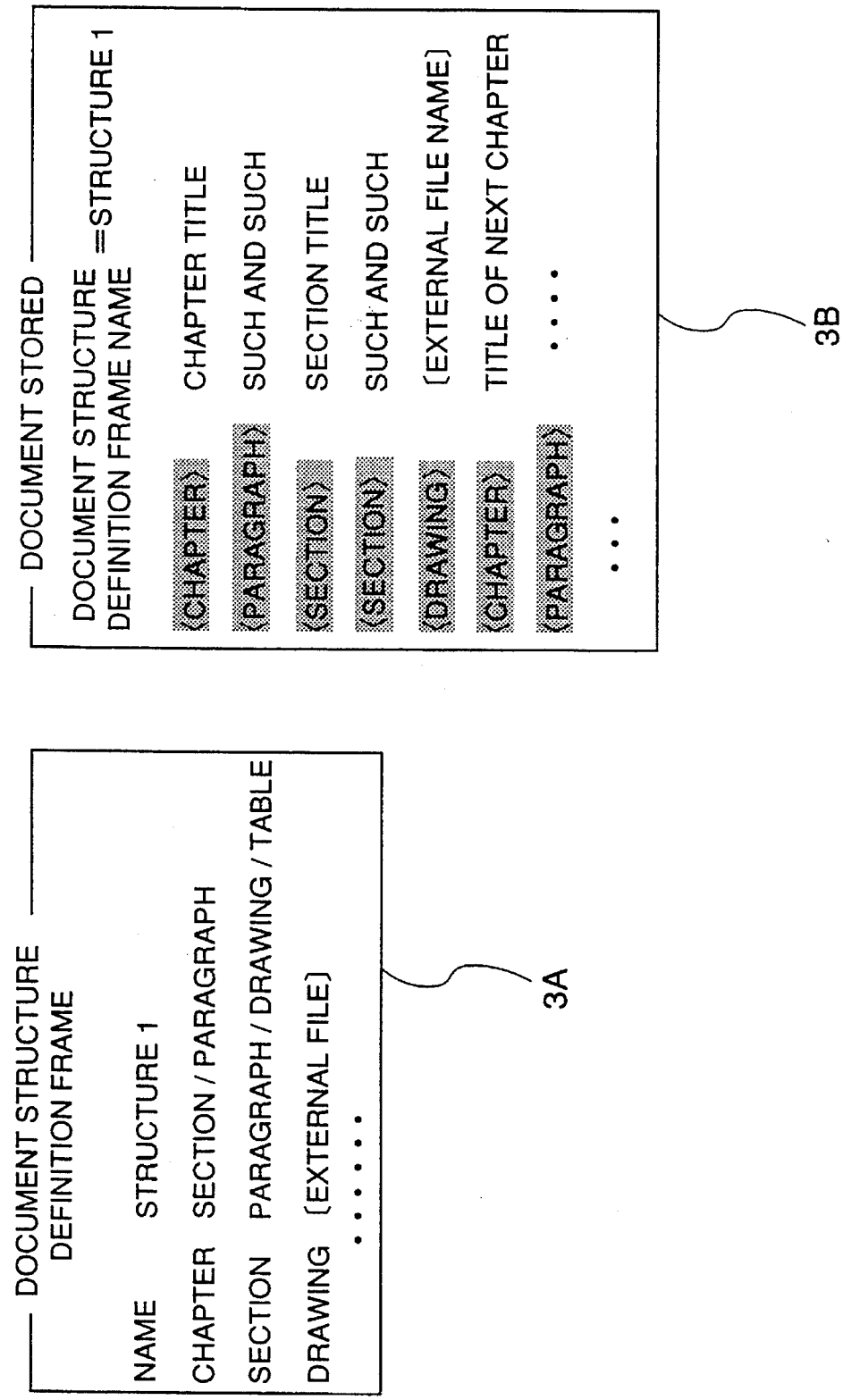
FIG. 3 is a diagram showing a structure definition frame and a document stored in a database according to the embodiment of the present invention.

According to the embodiment of the present invention, the infrastructure of the structured database is designed so that the structure of a document itself is defined as the structure of the database system. More particularly, as shown in FIG. 3, the structure of a document is defined by using a language and thereby a document structure definition frame 3A is created. In the example shown in FIG. 3A, the structure definition frame 3A is named "structure 1" in the first line thereof. The second line of the structure definition frame 3A shows that sections and paragraphs are included in chapters, and the third line thereof shows that paragraphs, drawings and tables are included in sections. Further, the fourth line of the structure definition frame 3A shows that drawings are external files.

As shown in FIG. 3, a document 3B is given the same name as that of the structure definition frame 3A and is connected with the structure definition frame 3A. Further, tags such as <chapter>, <section>, <paragraph>, and <drawing> are provided in order to indicate the structure of the document 3B.

Figure 4:
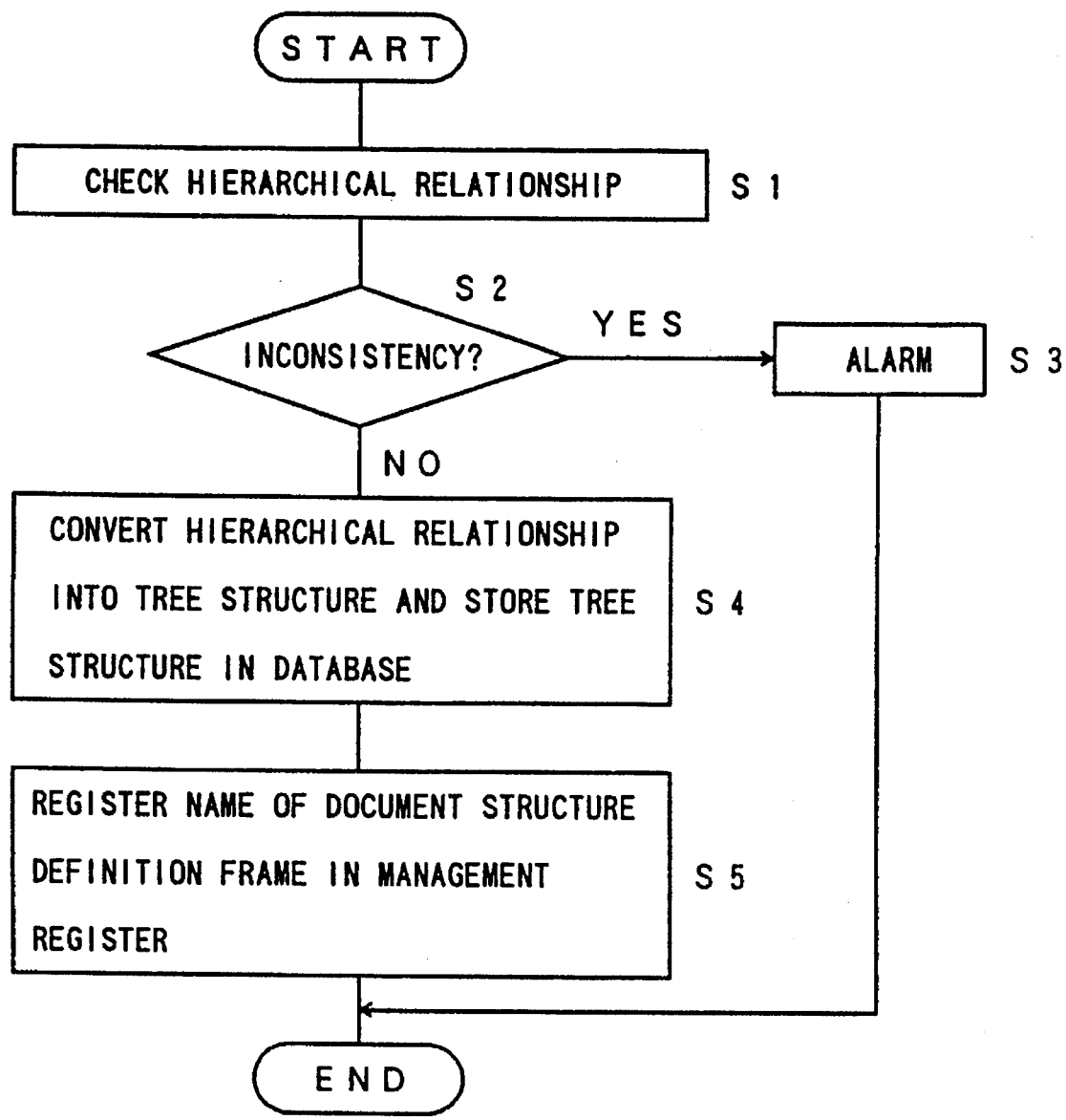
FIGS. 4 and 5 are flowcharts of a process converting information concerning a document into information suitable for the database according to the embodiment of the present invention.
Figure 5:
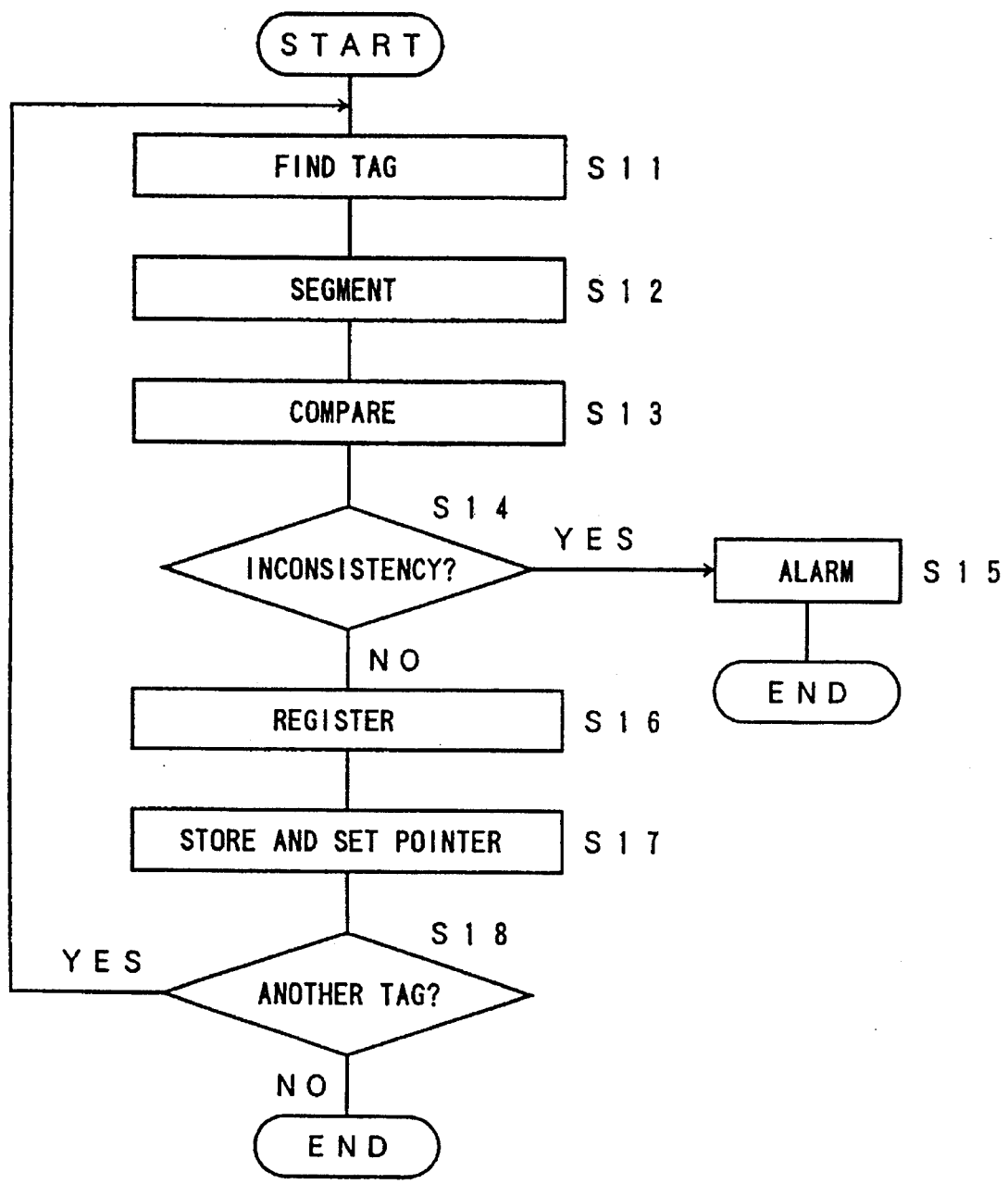

The structure definition frame 3A and the document 3B, input to the input unit 10, are supplied to the collecting unit 12, which performs processes shown in FIGS. 4 and 5. FIG. 4 is a flowchart of a process for creating a database of the structure definition frame 3A. In step S1 of the flowchart shown in FIG. 4, the hierarchical relationship between the elements of the structure definition frame 3A, such as the chapters, sections, paragraphs, drawings and tables, is interpreted and checked. In step S2, it is determined, based on the check results, whether or not there is any inconsistency in the hierarchical relationship. If an inconsistency is found in the hierarchical relationship, an alarm is generated in step S3 in order to cause the structure definition frame 3A to be modified.

If no inconsistency is found in step S2, the hierarchical relationship between the elements of the structure definition frame 3A is converted into the form of a tree structure and stored in the database 14 in step S4. In step S5, the name of the structure definition frame 3A is registered in a management register in the database 14. Then, the process shown in FIG. 4 is ended.

FIG. 5 is a flowchart of a process for converting a document into information in the form of a database. In step S11 shown in FIG. 5, the document 3B is read from the leading end thereof until a tag is found. In step S12, data between the above tag and the subsequent tag is segmented. In step S13, the tag attached to the leading end of the segmented data is compared with the related structure definition frame 3A specified in the document 3B.

In step S14, it is determined whether or not there is an inconsistency in the result of the comparison performed in step S13. If an inconsistency is found in step S14, an alarm is issued in step S15 to make the document modified. If there is no inconsistency, the tag attached to the leading end of the segmented data is registered in the tree structure in step S16. In step S17, the data following the above registered tag is stored in the database 14, and a pointer, indicating an area in which the segmented data is stored in the database 14, is given to the tag registered in the tree structure.

Thereafter, in step S18, it is determined whether or not the document 3B has another tag. When the result of this determination is affirmative, the process proceeds to step S11. When the result of the step S18 determination is negative, the process shown in FIG. 5 is ended.

Figure 1A:
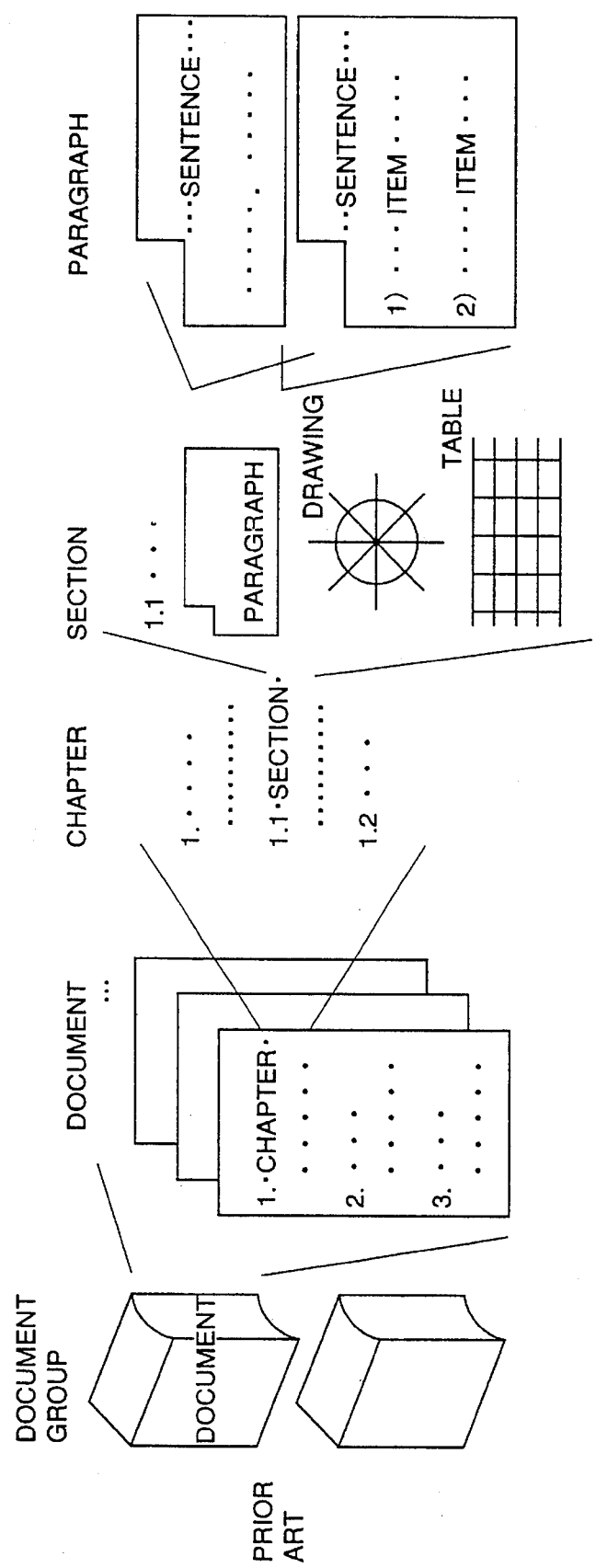
FIGS. 1A and 1B are illustrative and symbolic diagrams respectively which show a structure of a document.
Figure 1B:
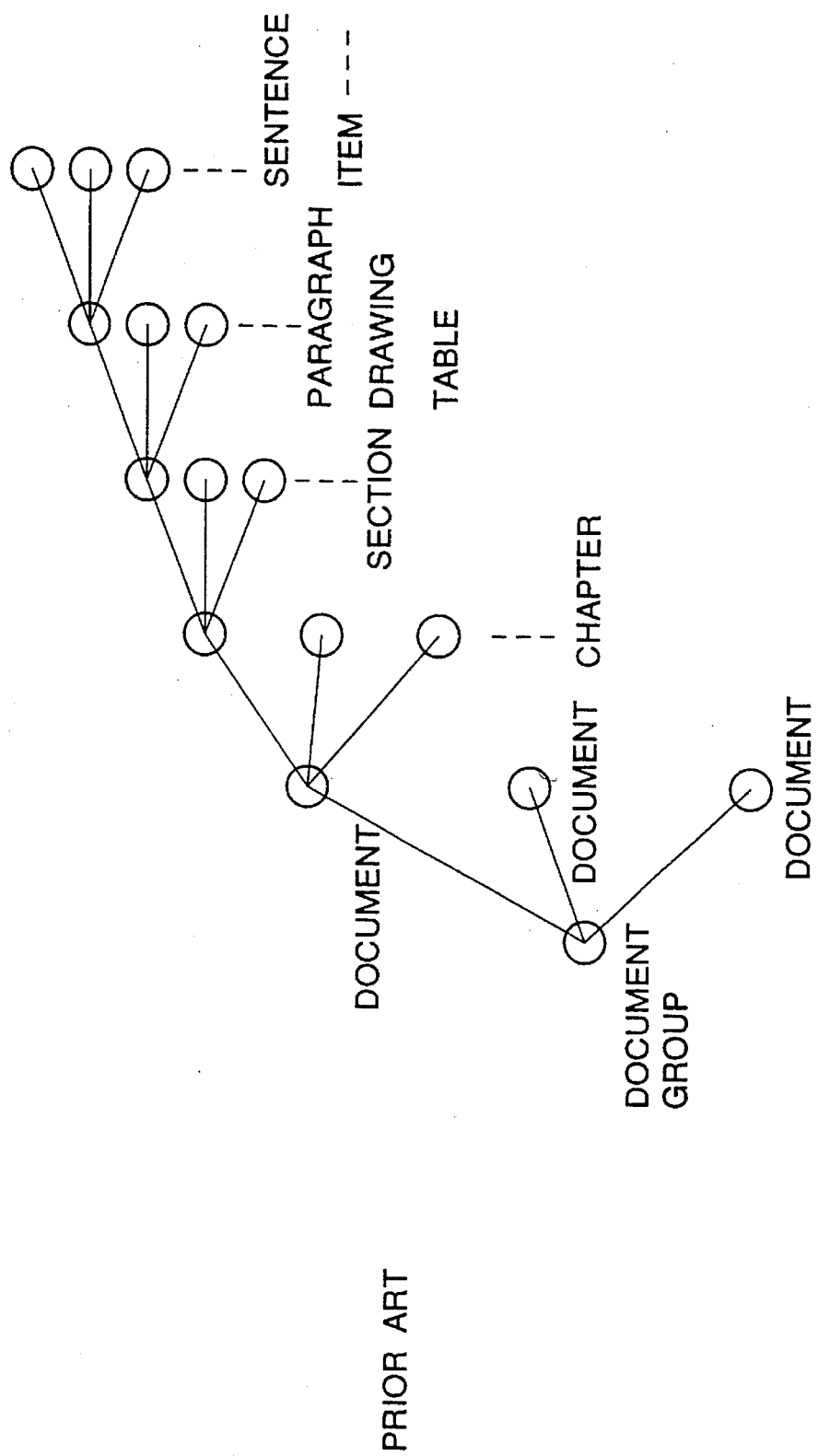

By executing the processes shown in FIGS. 4 and 5, the structure definition frame 3A and the document 3B are respectively converted into tree structures 30 and 31 as shown in FIG. 1 and are then registered in the database 14.

In the above-mentioned manner, the structure definition frames for documents are provided, and the names of the structure definition frames are given to the respective documents in order to connect the structure definition frames with the documents. With the above structure, it becomes possible to define the RDBs and the spreadsheets as tables. All or part of each document is then handled as data within the existing database systems. The interfaces with the above database systems are realized by creating interface routines for interfacing with the database access languages such as the SQL (the standard access interface for the RDB). Hence, it becomes possible to access the database system according to the embodiment of the present invention by means of the standard languages having the standard database access interfaces.

The structure definition frames and the documents are separately stored, and the connections therebetween are established by only information indicating which structure definition frame is used in each of the documents. Hence, even if the document structure is modified, it is not necessary to modify the document itself as long as the modification retains the structure before the modification. When documents have an identical structure, it becomes possible to use the identical structure in common to the documents only by changing the tag names if different tags are used. That is, the documents are arranged in the form of the tree structure, and an identical structure can be commonly used for many documents. Further, there is a case where one document can use a number of structure definition frames. That is, one piece of information is stored and utilized in a number of database structures.

Further, since the documents are arranged in the form of the tree structure, and pairs of tags and document contents related to these tags are separately stored, it becomes possible to perform information retrieval reflecting the document structure by means of a path (for example, the chapter name→the section name→the sub-section name→paragraph number) based on the document structure. As a result, the document parts containing target information can be easily obtained by tracing the path rather than searching about for the target information.

Further, it is easily possible to manage modifications of layout information versions, or editions by defining layout information, and by describing the formats of printing and display in the same format as the documents.

Furthermore, the following advantages can be obtained by separately processing tag parts (the contents of the tags are not changed) and by indicating the structure and the contents of information to be modified by means of an editor (structured editor) for operating the database. In a case where the cursor is moved on the display of the editor (to point to portion to be modified) and, if the cursor is located at a tag, it can be inhibited from deleting and modifying a character in the display position of the tag. If the cursor is located in a position in which information to be modified is displayed, it is allowed to add, delete and modify the information and display the position of the cursor in the document and to display information (tag information and so on) which can be input in the above position.

Since the document structure is handled separately from the document itself, it is possible to requires a particular remedy, i.e., program, for access document.

Figure 6:
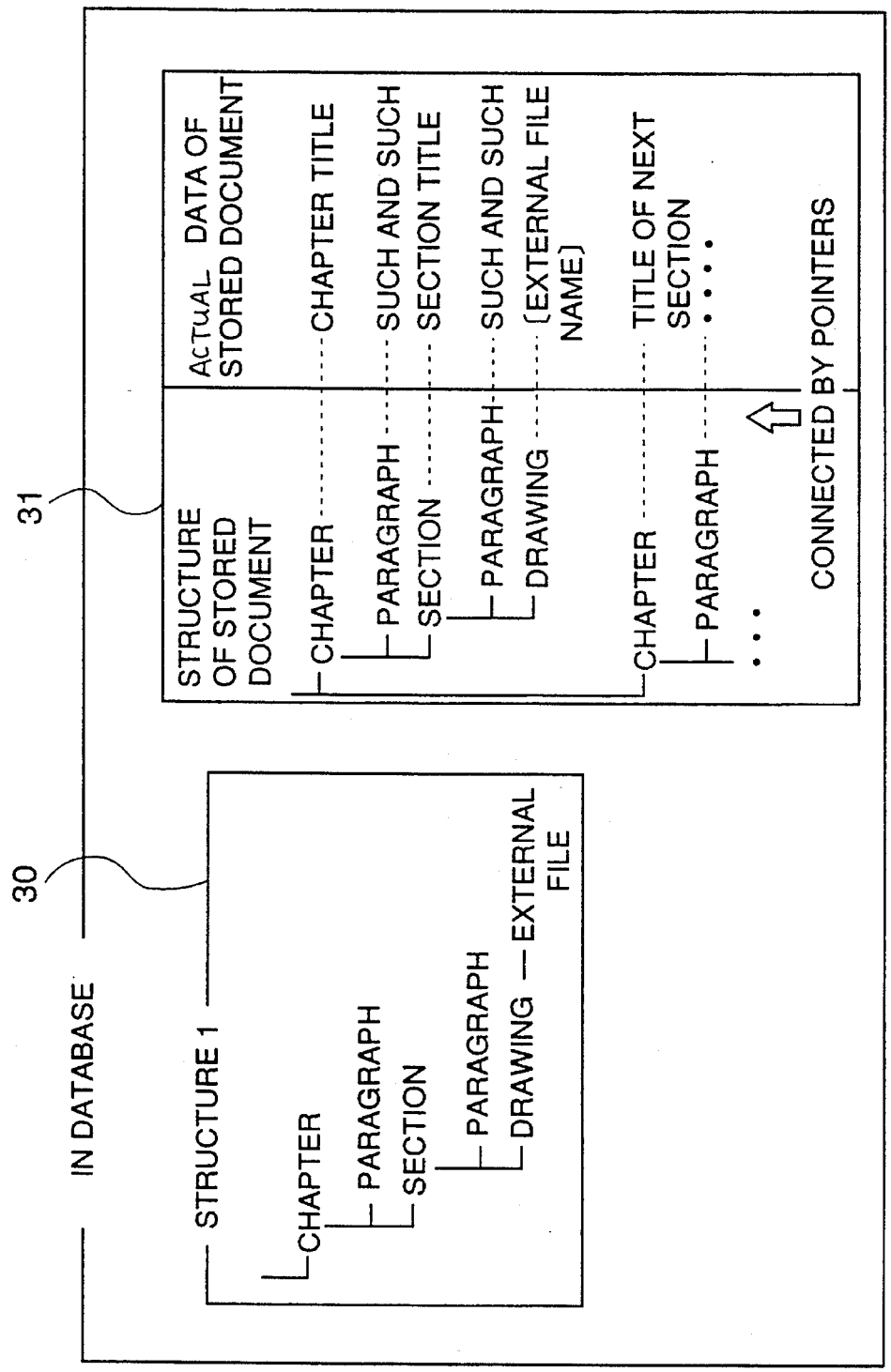
FIG. 6 is a diagram of an example of information stored in the database according to the embodiment of the present invention.
Figure 7:
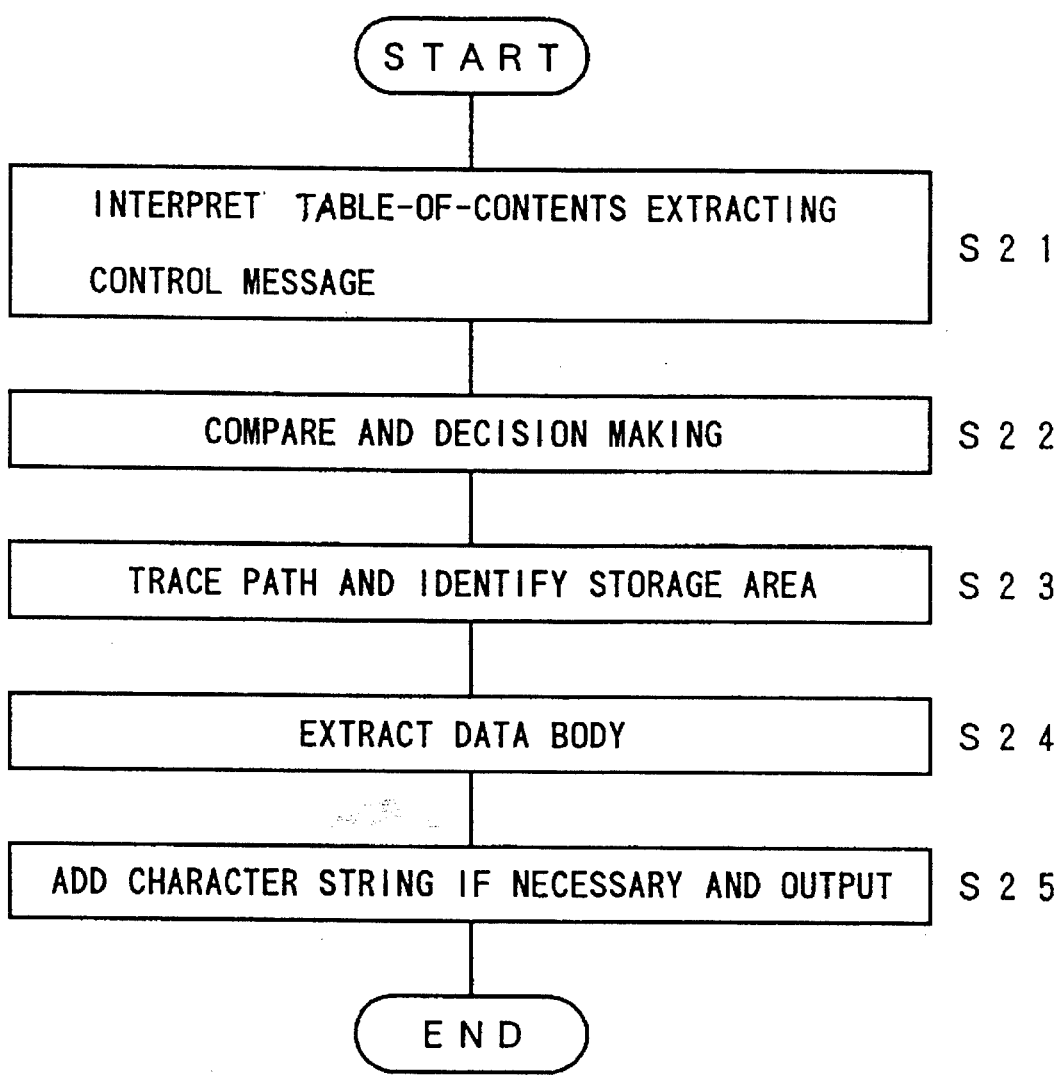
FIG. 7 is a flowchart of a process for creating a table of contents according to the embodiment of the present invention.
Figure 8:
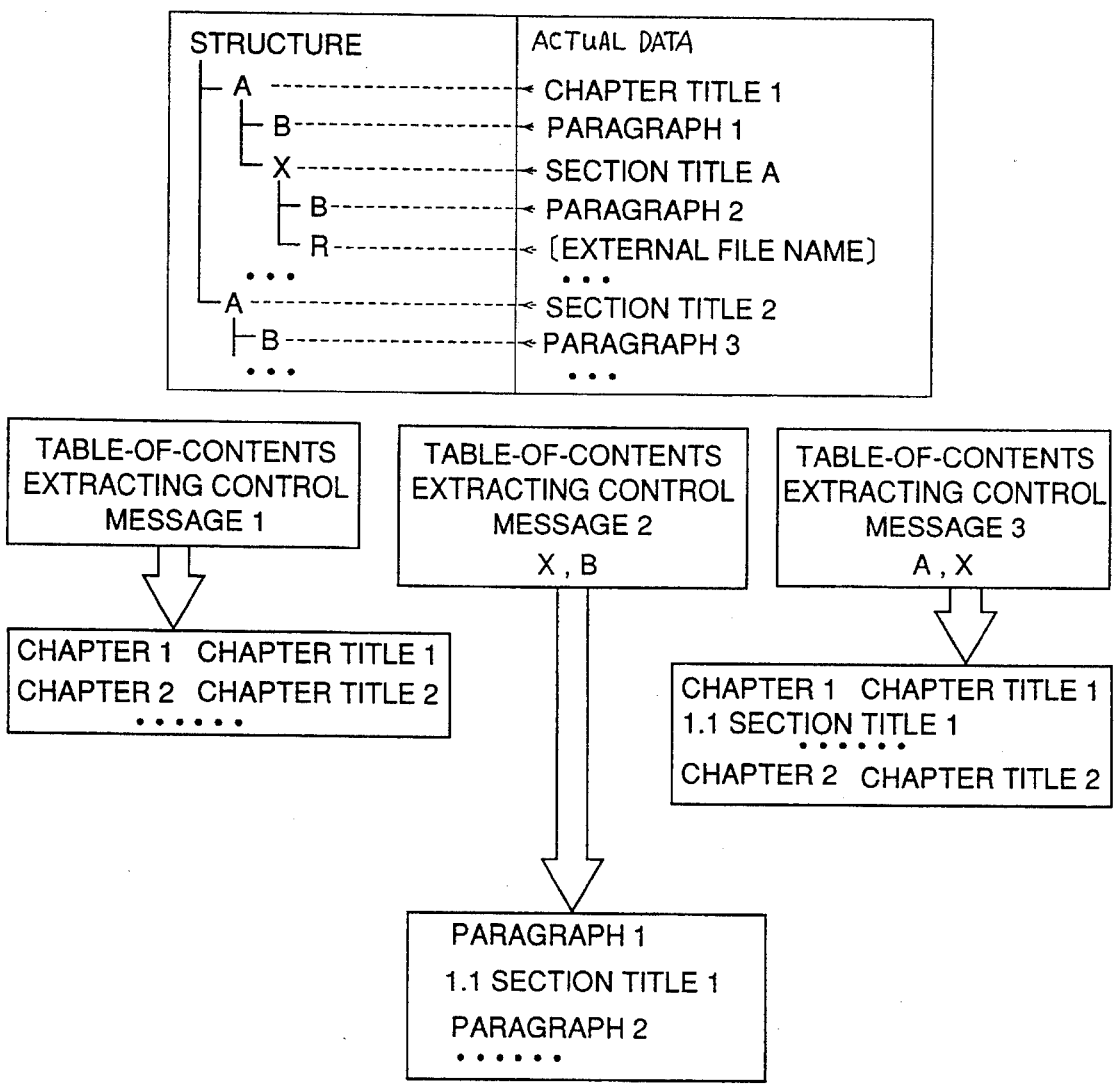
FIG. 8 is a diagram showing an example of the table-of-contents creating process shown in FIG. 7.

FIG. 7 is a flowchart of the process for creating a table of contents of a document. FIG. 8 shows an example of the process shown in FIG. 7. In step S21, a table-of-contents extracting control message is interpreted. In the table-of-contents control message, labels such as <chapter> and <paragraph> in the database shown in FIG. 6 are specified. In step S22, the structure definition frame 30 specified in the document 31 is compared with the labels included in the table-of-contents control message, and it is determined which data of the document 31 should be extracted.

In step S23, the tree structure describing the structure of the document 31 is traced by means of a path based on the structure, and the storage position (pointer) storing the data related to the labels indicated as requiring extraction is identified. In step S24, the identified data is extracted. In step S25, if necessary, a character string indicating the chapter, section and so on is added to the extracted data, which is then output.

For example, when the labels <chapter> and <section> are specified by the table-of-contents control message with respect to the document shown in FIG. 6, [chapter title], [section title], [next chapter title] are extracted as items of the table of contents.

Turning now back to FIG. 2, a document stored in the database 14 is checked out (extracted) and is sent to a processing unit 15, which edits the checked-out document. After editing, the edited document is checked in (returned to) the database 14. The document in the database 14 is read by a delivery unit 16, and is output to an output unit 17, which prints out and copies the output document and which directly displays the document by means of an on-line viewer. The database 14 is managed by a management system 20.

Figure 9:
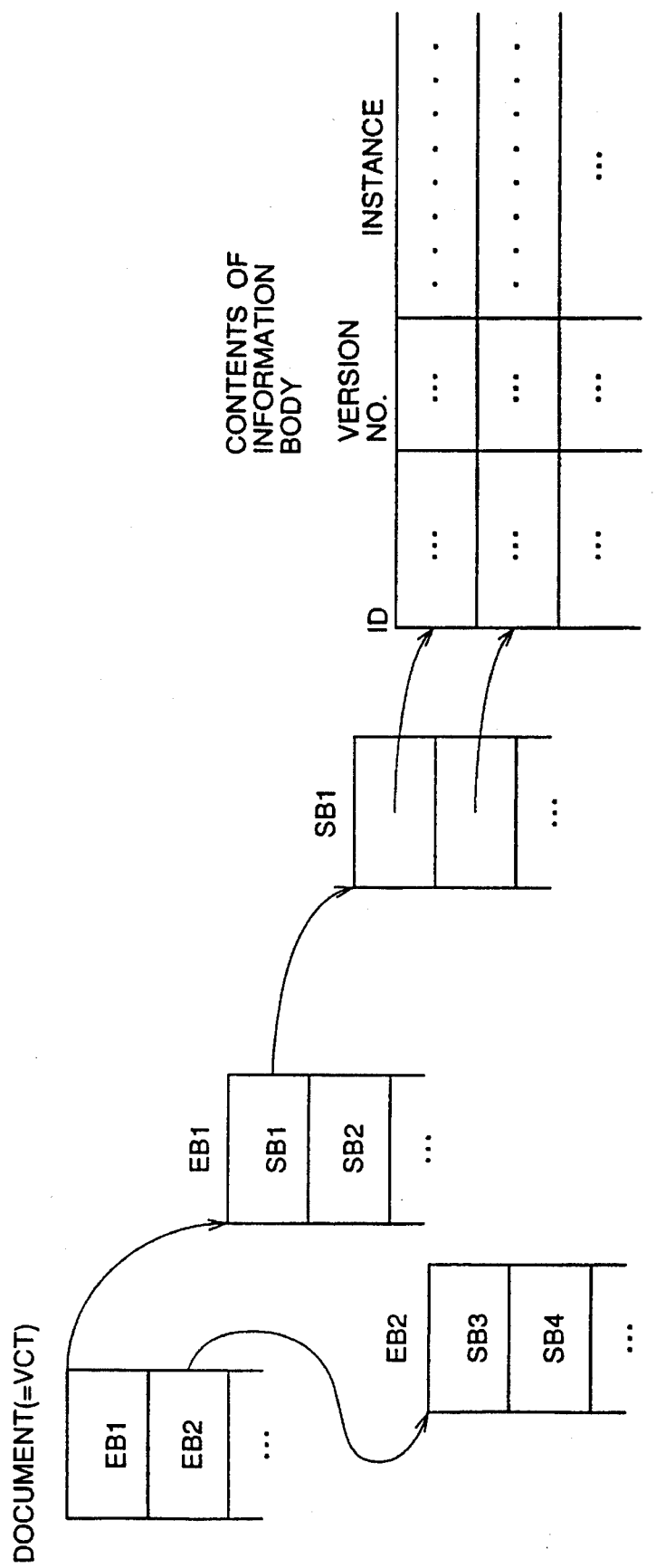
FIG. 9 is a diagram showing how data is stored in the database according to the embodiment of the present invention.

Data is stored in the database 14 in the form shown in FIG. 9. For management of documents, a version control table (VCT) is defined for each of the versions of each of the documents. Further, in order to manage the elements of each document, a logical management unit EB (Edit Block) and a physical management unit SB (Storage Block) are defined. The edit blocks EB indicating the elements of the corresponding document are registered in the version control table, and each of the edit blocks ED stores the storage blocks SB contained therein.

The version control table VCT is a table in which pointers indicating connections to the edit blocks EB are defined. Each of the edit blocks EB is a unit in the structure of the document. For example, one edit block EB is the chapter, section, or paragraph, or individual each item as itemized information. It may be possible for each edit block EB to have a different hierarchical level (the edit blocks EB having the unit of chapter and the edit blocks having the unit of list item may be mixed). The edit block EB is a table in which pointers indicating connections to the storage blocks SB are defined. The storage block SB is a table storing pointers indicating individual element units (located with tags indicating the structure) in blocks of information.

It is possible to register the storage blocks SB in the version control table VCT. The process in this case can be performed in the same manner as the process in the case shown in FIG. 9. However, there are not many cases where all the element units are changed each time the documents are revised. Hence, it is convenient to store the edit blocks EB in the version control table VCT because management including the management of the structure can be efficiently performed with ease. Each document in the progress of development is managed by a VCT' equivalent to the version control table VCT. When a document to be handled at the commencement of creating the first version (edition) or revising the latest version is specified, the version control table VCT' is created. At the commencement of revising the latest version, the version control table VCT' is a copy of the version control table VCT. When the development of the first version or revision of the version is completed, the edit blocks registered in the version control table VCT' are collected in the process of authorization, and the version control table VCT for the revised version is formed while the old version control table VCT is saved. Hence, the documents of the old and new versions are managed in parallel. This management includes the contents of the old and new versions.

The contents of the information bodies are contained in each of the storage blocks SB. The contents of the information bodies are control information and an instance (a character string indicating real information or an external file name). The control information includes an identifier ID identifying the contents of the information body of concern, the version number of the contents of the information body, a data type indicating whether the data indicates the structure of the document or a character string of the document, a link destination, a link source, and the attribute of the link. The contents of the information body can be identified together with the control information. The contents of the information body are arranged so that pairs of the structure of the document and the body data of the document are sequentially continued.

When a document is modified, the check-out and check-in operations are carried out in the edit block EB unit. Addition, modification and deletion of information is so that the extracted part is located in the closed state in the check-out destination. In the master database, the contents of the information body are not modified in cases other than the check out.

The check-out/check-in operation is performed for a unit which is completed as a part of the structure of the document (for example, chapter, section, paragraph and so on). One edit block is created for one completed part of the document at the time of check out. At the time of check in, a modified part of the edit block EB is traced and the edit block EB in the master database is updated.

At the time of check-in, the edit block, a group of storage blocks linked thereto, and the contents of the information bodies are simultaneously checked in. When the check-in of data is completed, the checked-in edit block EB containing a modification is compared with the edit block EB before the check out is performed. The difference between the new version and the old version is retained as the edit block EB for the old version and the version control table VCT' is updated. Hence, the speed of accessing a document in the progress of development or modification can be improved and a number of old versions can be saved without any inconsistency.

The edit blocks are formed so as to be the version control table VCT when viewed from the check-out destination. The edit blocks are given from the first check-out destination to the second and third check-out destinations where the check-out operation is performed. Thereby, it becomes possible to reflect, without any inconsistency, the activities in the progress of document development and version revision on the database system. For example, it becomes possible to easily manage a process in which a primary outside order of a modification in the edit blocks EB is issued in the edit block unit, and a secondary outside order of a modification in some edit blocks EB contained in the primary outside order is further issued.

By separating the edit block EB which is the logical management unit from the storage block SB which is the physical management unit, it becomes possible to flexibly form the physical structure of the database and improve efficiency in use of the storage medium independent of data stored in the database. For example, it is possible to perform a tuning process in which the physical performance of the database matches the physical performance of the storage medium. For example, it is possible to form the storage block SB in the unit equivalent to a paragraph, chapter or section and to form one storage block SB for the whole document.

The version number is managed in the instance unit, and hence a document can be formed by collecting instances belonging to arbitrary version numbers. As a result, even in a case where the user uses a system particularly having old components, it becomes easily possible to provide the user with a manual of such a system and materials kept by the user. That is, information concerning the document structure is dynamically utilized for managing information.

The method of performing, in the storage unit, the management of versions regarding the structure of the document and body data is realized by using an editor as follows.

Figure 10:
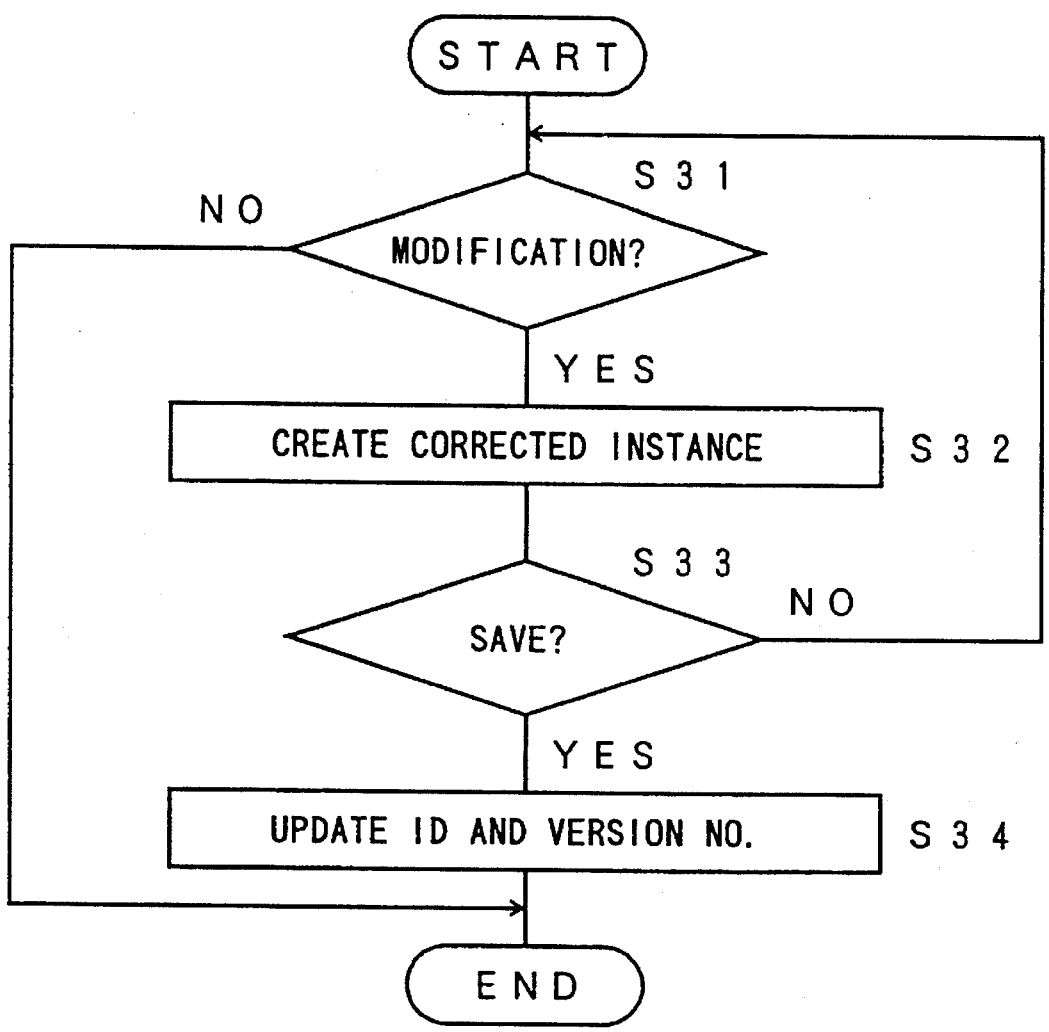
FIG. 10 is a flowchart of a process for modifying a document according to the embodiment of the present invention.

FIG. 10 is a flowchart of a process for updating the document executed by the processing unit 15. The process shown in FIG. 10 is initiated when the processing unit 15 is informed of start of a modification by an application program executed in a terminal 15a of the processing unit 15.

When work on an instance is completed, the document updating process shown in FIG. 10 is started. In step S31, it is determined whether or not a modification has been added. When it is determined that a modification has been added, a modified instance is created and added to the tail end of the storage block. When no modification has been made, the updating process is ended. For example, if a modification is added to instance A, a modified version of the instance A is created when a work shifts to instance B. The modified version of the instance A is added to the tail end of the storage block SB, and a mark indicating that the modification is completed is added to the identifier ID of the instance before the modification. Further, the pointer from the related edit block EB is changed.

When modifications are added to an identical instance a number of times, the check-out of the instance for modification is performed along the pointer from the edit block. Hence, it is possible to pick up the latest instance.

When it is determined, in step S33, that a sequence of modifications has been completed, that is, when an instruction indicating saving of the modified edit blocks is issued by the application program, step S34 is executed in which for each instance the identifier ID and the version number of the oldest instance given a mark indicating invalidity are retained, and the version number of the latest modified instance is incremented. Further, the other instances which have been modified are deleted in step S34. Then, the process shown in FIG. 10 is ended.

In the above manner, the contents of the information body (old version), for which modification or deletion is carried out, are given the mark indicating invalidity, and the identifier ID and the version number of the contents of the information body are saved. At this time, the instance may be deleted in order to facilitate efficiency in the storage area. The deleted instance is retained in the master database. The added or modified contents of the information body themselves are added to the tail end of the storage block while the version number is incremented. Further, the pointer in the edit block EB is changed. Thereby, it is sufficient to manage record of the modified part in order to manage the history of the modified part, so that the amount of data relating to the record of modification can be reduced.

The specific value of the identifier ID of the instance is assigned to each of all instances within the master database, and a different value of the identifier ID is not assigned thereto after one identifier value has been assigned. Hence, it becomes possible to avoid over-assignment of the identifier ID without any inconsistency even when a modification needed to change the structure of the document is added and the check-in is carried out for the same database.

At the time of check out, the identifier ID of the master database is assigned to the edit block EB. By checking the identifier ID of the database and the structure of the edit blocks EB at the time of check in, it is possible to prevent erroneous modification of the master database even in a case where the edit block EB checked out from another master database is mistakenly checked in.

A copy of the document from another master database is handled in the document unit. In this case, the identifier ID of the copied document is determined again in order to provide consistency among the identifiers ID in the master database.

A description will now be given of a check-out/check-in management by the edit blocks EB. The check-in/check out for modification of the contents of a document is performed in the unit which is completed as a part of the structure (chapter, section, subsection, paragraph and so on). A part which is checked out is kept in a locked state within the database in order to prevent processes other than a reference process. Data which is checked out can be modified in the locked state whereby a data inconsistency can be prevented when the data is checked in.

Figure 11:
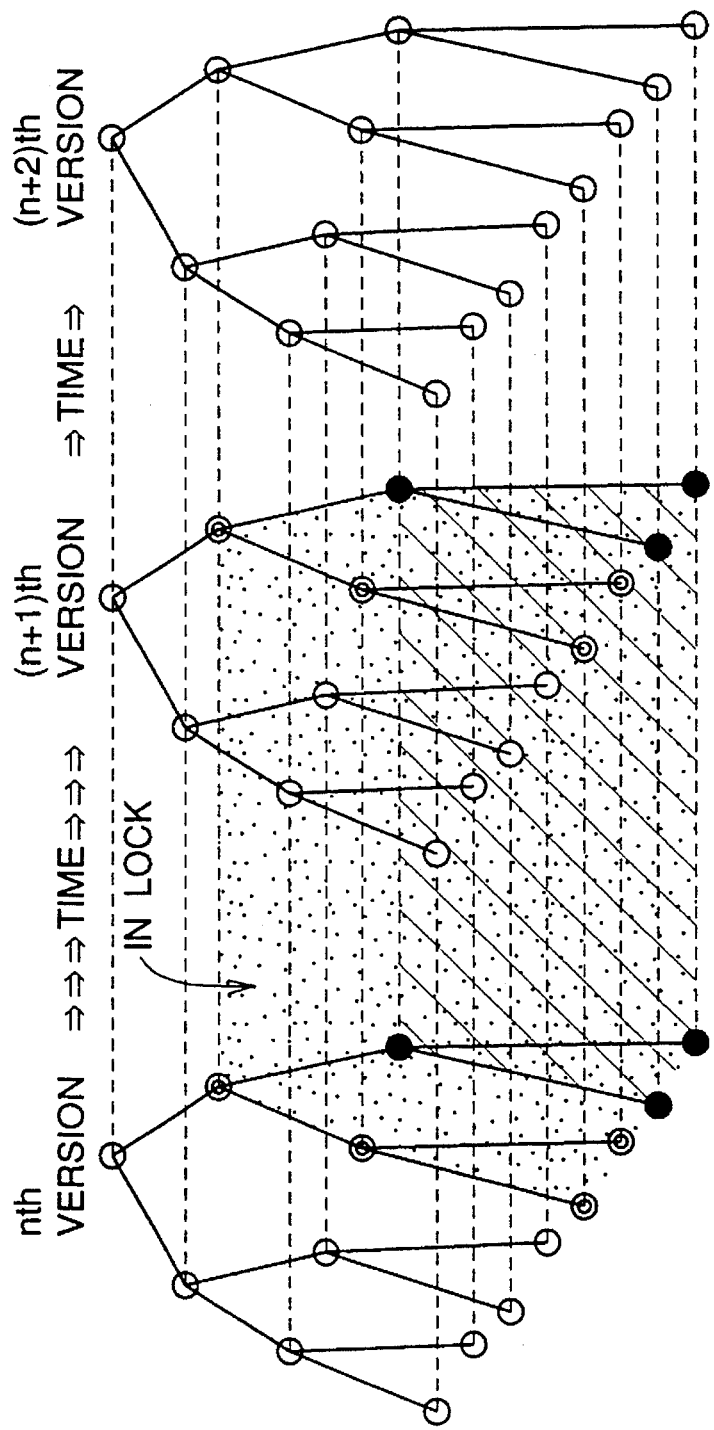
FIG. 11 is a diagram showing a check-in/check-output process according to the embodiment of the present invention.

Referring to FIG. 11, in a document of the nth version, the check in and check out are performed in the unit (EB) which is completed as a part of the structure and are indicated by tags of a double circle and a block dot, respectively. A tree-shaped part is locked during the check-out process of the edit block EB, and all processes other than the reference process are inhibited. In the reference process, a message "on loan" is issued. The check-out process is further possible by extracting the edit block EB at the checkout destination. The structure of the edit blocks is considered as being equivalent to the version control table VCT, and hence the tree-structured area can be handled as the whole document at the check-out destination. It is possible to extract, as one edit block EB, the parts which are formed with the tags of block dots and are completed as parts of the structure, that is, the areas indicated by slant lines within the tree structured and to check out these parts.

Further, during check out some edit blocks EB, (other parts not in the locked state and part of the structure) can be checked out to another system. Hence, it is possible to divide a document into some edit blocks EB to separately perform development or modification of these edit blocks EB.

A process for connecting body data in each of documents in the storage unit by means of a link table will now be described.

Figure 12:
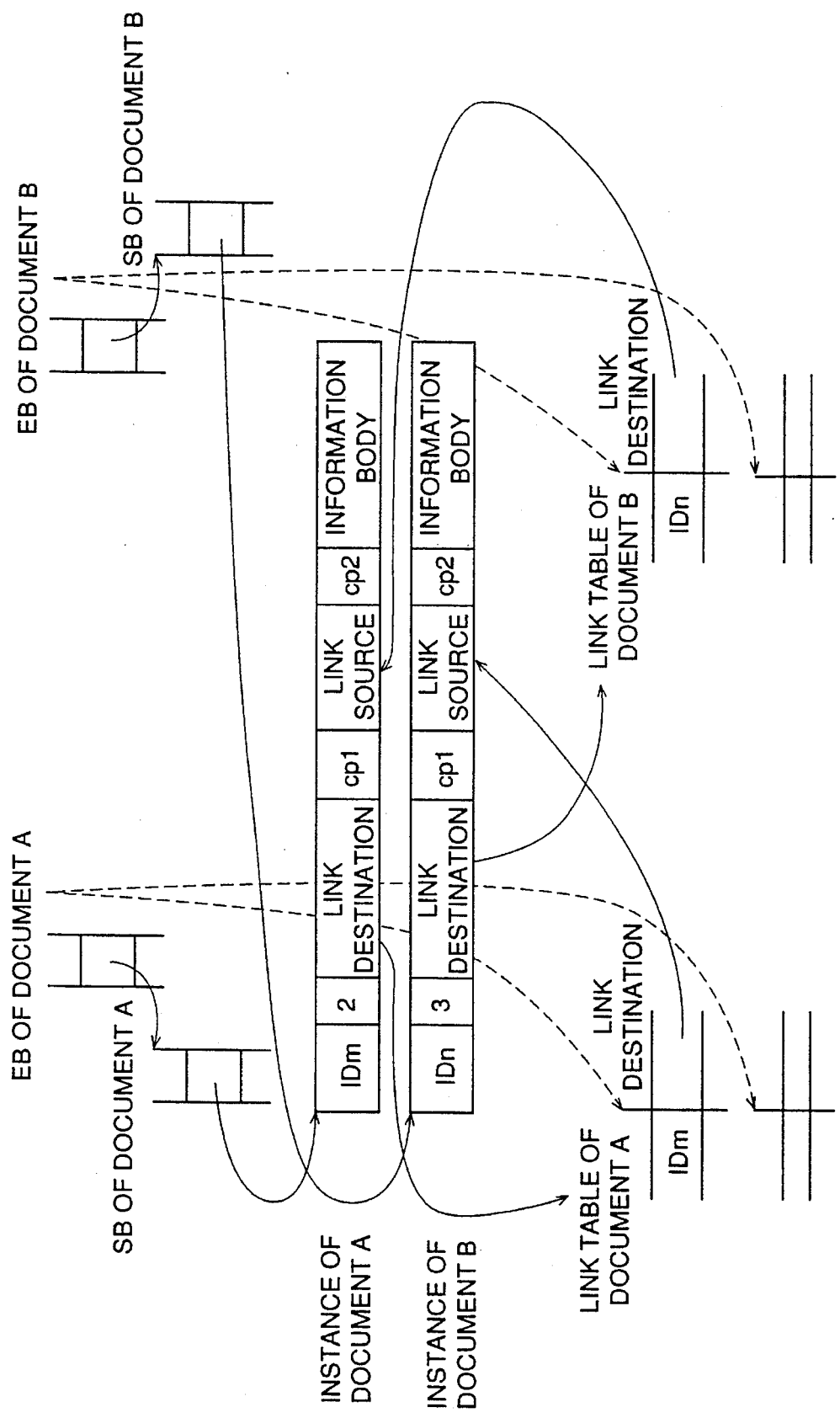
FIG. 12 is a diagram for explaining links between documents according to the embodiment of the present invention.

The link relationship between instances is managed by means of a link table, rather than providing a direct link extending from a part in which a link occurs. The link table is defined as a table of pointers regarding the link sources and the link destinations. FIG. 12 shows a process for establishing the link relationship between instances.

The link relationships between the units of the document structure in the edit block EB, such as chapter, section and paragraph are stored in the link table for each of the documents. The link table is registered in the edit block EB. The link table indicates the link relationship between the instances in the form of a table. That is, the link destination in each instance is a link table of control information, the link source for the control information concerning each instance is a link table. Even in a case where the link destination is an external file out of control of the database system and a change occurs in the link destination without concern of the database system, grouping is performed in such a manner that the link destination of the document body is set in the link table and hence the link is formed by two steps. Hence, it is possible to minimize influence in the above case. On the other hand, in the conventional hypertext system, the link destination is directly specified, and hence it is necessary to modify the document body if the link destination is changed.

The link relationship is described by the identifier ID of the instance. More particularly, the identifiers ID of the link source and destination are added to the identifier ID of the instance. For the same database, the identifier is simply added. When another database is referred to, the identifier ID of this database is added. With the above mechanism, it becomes possible to supply the status of version revision of the instance which is copied and transferred, sometimes with a modification, to another part for a certain purpose or which is used in common with another part.

Link attributes CP1 and CP2 indicating whether or not the link relationship should be copied at the time of copying the instance are given to the instance. When the link attributes indicate that the link relationship should be copied at the time of copying the instance, an inquiry will be issued which inquires whether or not the link relationship should be copied, in other words, whether or not the same instance should be linked at the copy destination. This is performed taking into the account the following matters. That is, when a part of the document is copied and transferred, a modification may be frequently performed. In this case, the modified document part is linked to another instance. Further, it becomes possible to prevent an unnecessary link relationship from occurring when a number of linked instances are copied.

Next, when a new version is made, links (called revised version links) are provided between the instances of the old version (before the revision) and the instances of the new version (after the revision) in order to enable tracing of the history of the revision for each of the information elements. In the revised version link, the link relationship is handled as an attribute inheriting the link relationship. Further, a notification showing that an instance has been modified is given to all instances having the link relationships, such as a source in which a part is copied and a destination in which the copied part is used, sometimes with a modification, and the original document and the translated version thereof. That is, at the time of check-in, flags indicating that a modification has been made are written into all the link tables of the instances of other documents having the link relationships with the modified document.

Figure 13A:
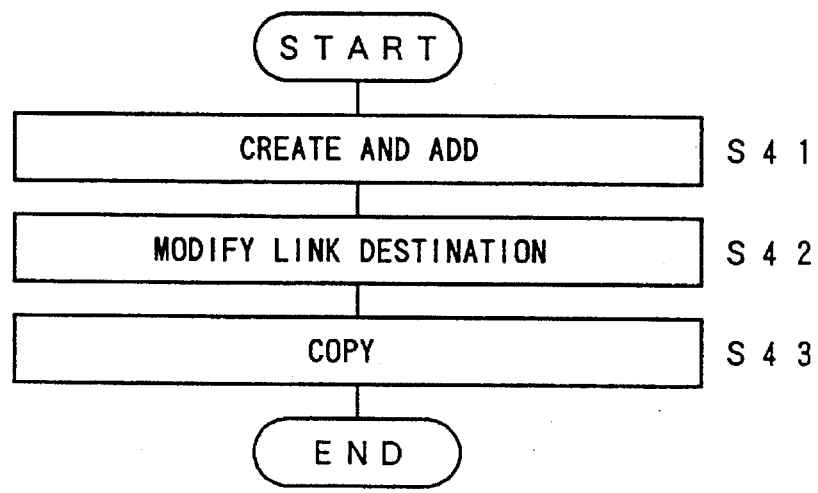
FIGS. 13A and 13B together in combination are flowcharts of a link modifying process according to the embodiment of the present invention.
Figure 13B:
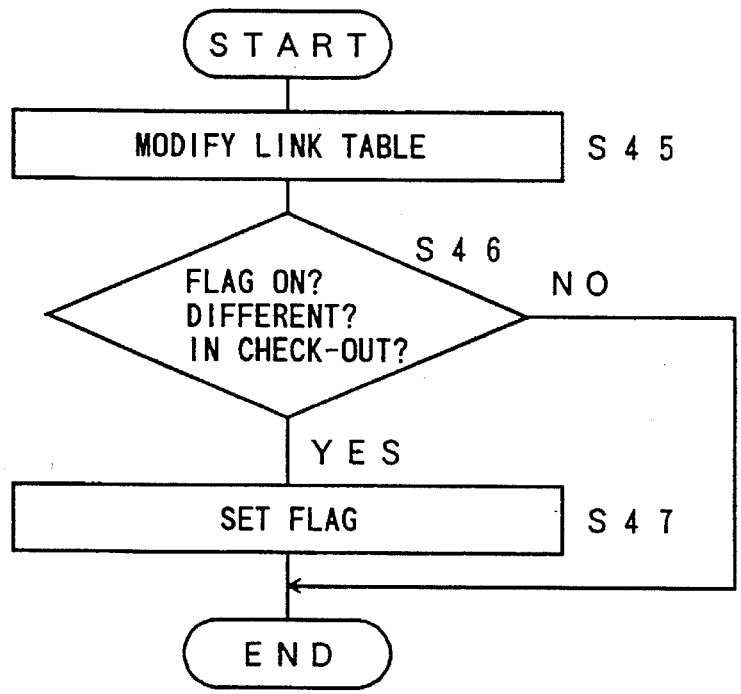
Figure 14:
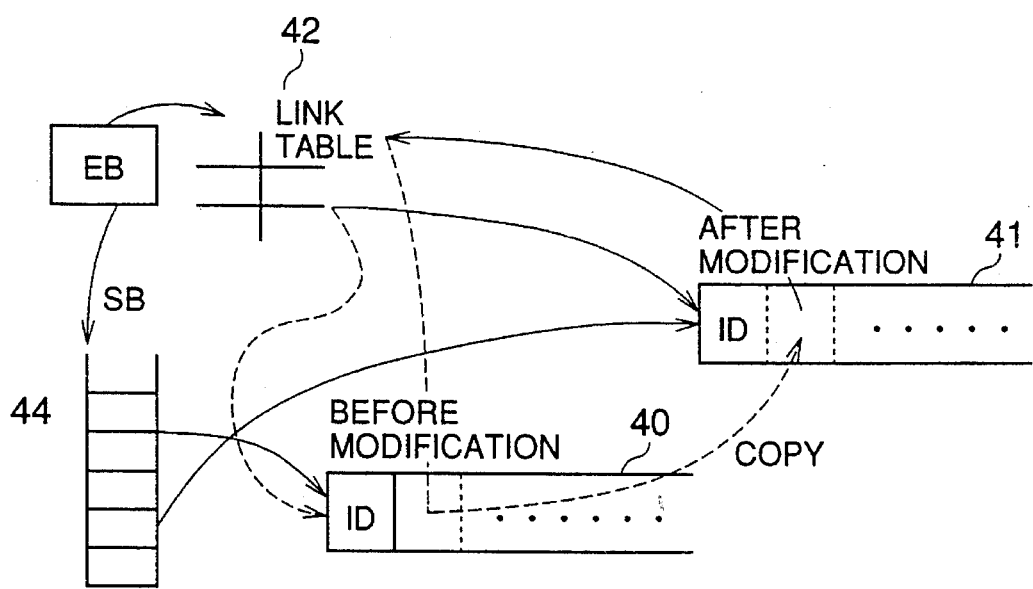
FIG. 14 is a diagram showing a link modification according to the embodiment of the present invention.

FIGS. 13A and 13B are flowcharts of a link modifying process executed by the processing unit 15.

The process shown in FIG. 13A is performed when the contents of the information is modified. In step S41, an instance 41 having a new information content is created, and is added to the tail end of the storage block 44. In step S42, the link destination in the link table 42 is modified so as to indicate the new instance 41 instead of the instance before modification. In step S42, the link destination of the instance 40 is copied and transferred to the link destination of the instance 41, and the process shown in FIG. 13A is ended.

The process shown in FIG. 13A is executed when the check-in process performed, i.e., when the modification is completed. In step S45, the link table and the edit block EB are traced in order to modify the link table of the linked instance. In step S46, it is determined whether or not the link table related to the link source shows the flag indicating that the linked instance has been changed/whether or not the version number of the linked instance differs from that used at the time of check-out 1 and whether or not the linked instance is in check-in. If the results of all the determinations are negative, the process shown in FIG. 13B is ended. If the results of all the determinations are affirmative, a flag indicating that the modification has been made is set in the link table of the linked instance, and thereafter the process is ended.

The flag indicating that the link table is modified is processed by determining whether the flag should be canceled by a corresponding modification or without the corresponding modification. This is because in many cases, a modification is given to the extracted instance and is not needed to be reflected in the original source instance itself.

A translated version of the original document is connected, in the following manner, with the original document by means of the link table in which the body data of the translated version is managed in the storage unit.

A translated version of the original document can be handled as revision of the version or edition. That is, the original document corresponds to the old version of the document, and the translated version of the original document corresponds to the new version of the document. Hence, the link modifying process performed by the processing unit 15 when a translated version is created is the same as that shown in FIGS. 13A and 13B.

The relationship between the instances of the original for translation and the instances of the translated version are managed by linking. In this case, document A shown in FIG. 12 corresponds to the original for translation, and document B shown therein corresponds to a translated version. As described previously, when a Japanese document is translated into English, for example, information inherent in Japanese may be omitted or one paragraph written into Japanese is divided into a number of paragraphs written into English. In this case, the information elements of the Japanese document and those of the English translation do not directly correspond to each other one by one. Even in this case, the correspondence between the Japanese document and the English translation can be managed for each information element.

A description will now be given of a mechanism for handing only an editable part under a situation in which a not-editable part is simultaneously handled with the editable part.

Figure 15:
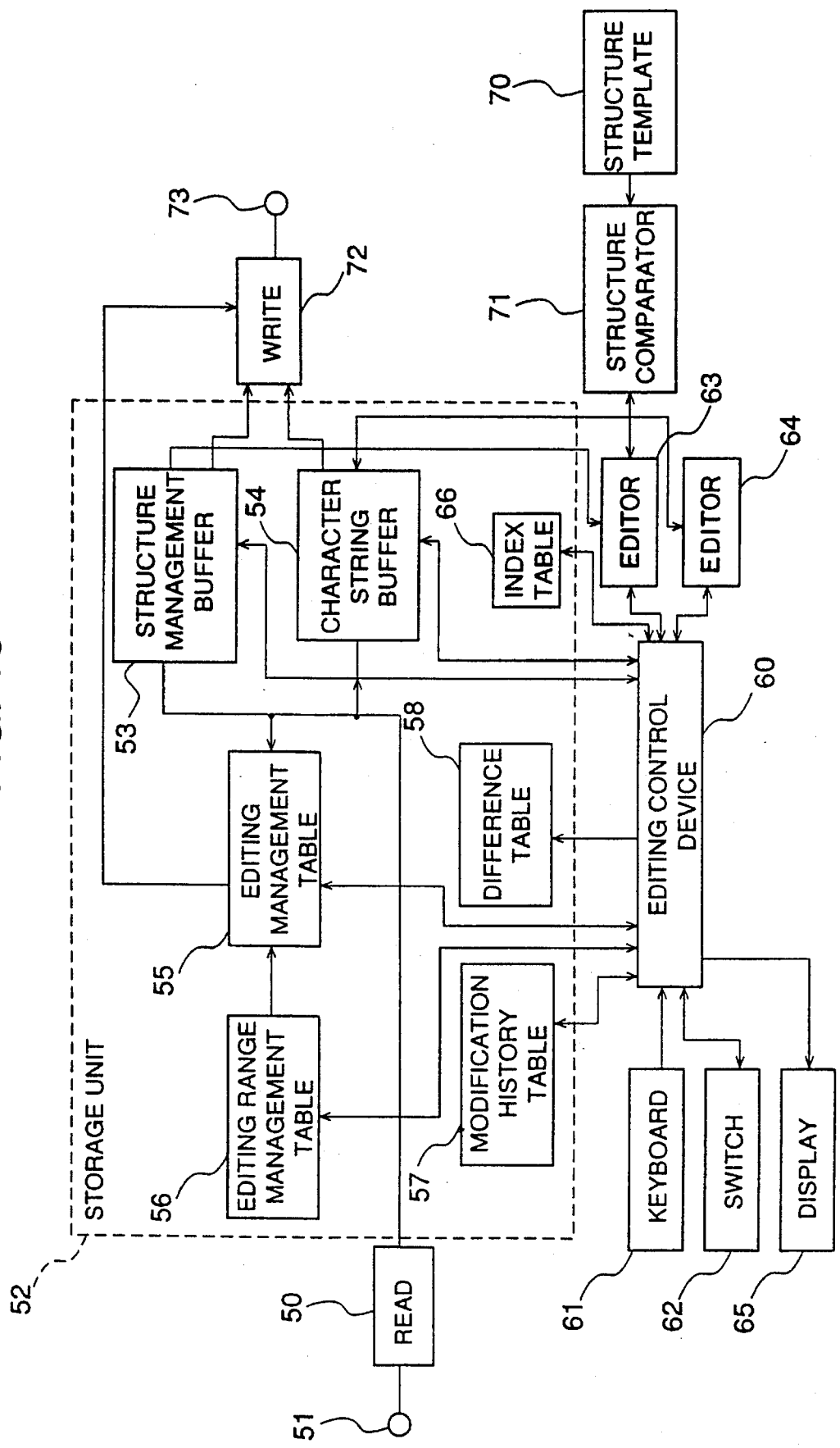
FIG. 15 is a block diagram of an editing device used in the embodiment of the present invention.

The editing device of the processing unit 15 will now be described. FIG. 15 is a block diagram of the processing unit 15 of the editing device. A read unit 50 is connected, via a terminal 51, to a database 15b for use in editing. The read unit 50 reads a desired document from the database 15b and causes this desired document to be stored in a structure management buffer 53 and a character string buffer 54 of a storage unit 52. Further, the read unit 50 creates an editing management table 55.

An editing control device 60 is supplied with an editing input from a keyboard 61 and an editing mode indication signal specified by a switch 62. The editing control device 60 refers to an editing range management table 56, and causes an editor 63 to edit the contents of the structure management buffer 53. Further, the editing control device 60 causes the editor 64 to edit the contents of the character string buffer 54 and causes a display unit 65 to perform a display of editing.

The structure definition frame 30 of the document shown in FIG. 6 is stored in a structure template 70 in advance. When the editor 63 edits the contents of the structure management buffer 53, a structure comparator 71 determines whether or not the edited document structure is consistent with the related structure definition frame stored in the structure template 70.

A write unit 72 refers to the editing management table 55 and obtains the control information such as the identifier ID and the structure type. Then, the write unit 72 adds the read control information to the instance of the structure type read from the structure management buffer 53 by an instruction address of the editing management table 55. Further, the write unit 72 refers to the editing management table 55 and obtains the control table such as the identifier ID and the structure type. Then, the write unit 72 adds the read control information to the instance of the character string type read from the character string buffer 54. In the above manner, the structured documents are sequentially created, and are written onto the database 15b via a terminal 73.

A version number management based on difference data concerning structure data and information body data in the storage unit is carried out as follows.

The editing control device 60 writes editing history data and an index of the difference data (difference between data before and after editing) into a modification history table 57, a difference table 58 and an index table 66 of the storage unit 52.

FIG. 16 is a flowchart of the read process of the read unit 50. In step S50, the read unit 50 determines whether or not reading of a document is completed. If it is determined that reading is not completed, the read unit 50 reads a document in the instance unit in step S51.

In step S52, the read unit 50 determines whether the data type of the instance of concern is the structure or a character string by referring to the control information added to the above instance. In the case of the structure type, the read unit 50 registers the instance in the structure management buffer 53, and registers the identifier ID, the data type and the write address of the buffer 53 into the editing management table 55 in step S53. Then the process returns to step S50. In the case of the character string, the read unit 50 writes the instance into the character string buffer 54, and registers the identifier ID, the data type and the write address of the buffer 54 into the editing management table 55 in step S54. Then, the process returns to step S50.

Figure 17:
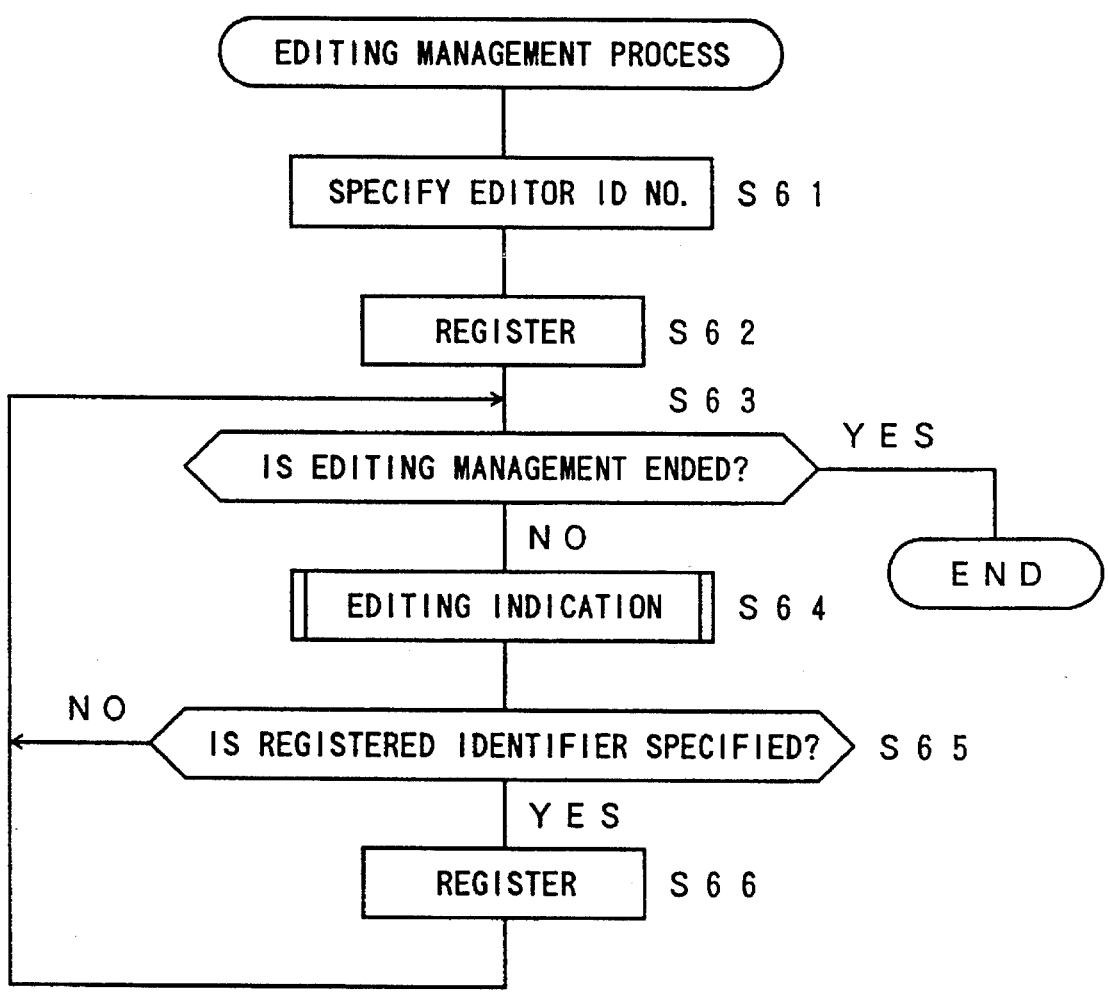
FIG. 17 is a flowchart of an editing management process executed by the editing device shown in FIG. 15.

FIG. 17 is a flowchart of an editing management process executed by the editing control device 60 operated by an editing management person who manages a number of editors. In step S61, an editor identification number (hereinafter referred to as a registered identifier) which specifies an editor who performs editing using the keyboard 61 is input and registered in step S62.

Figure 18:
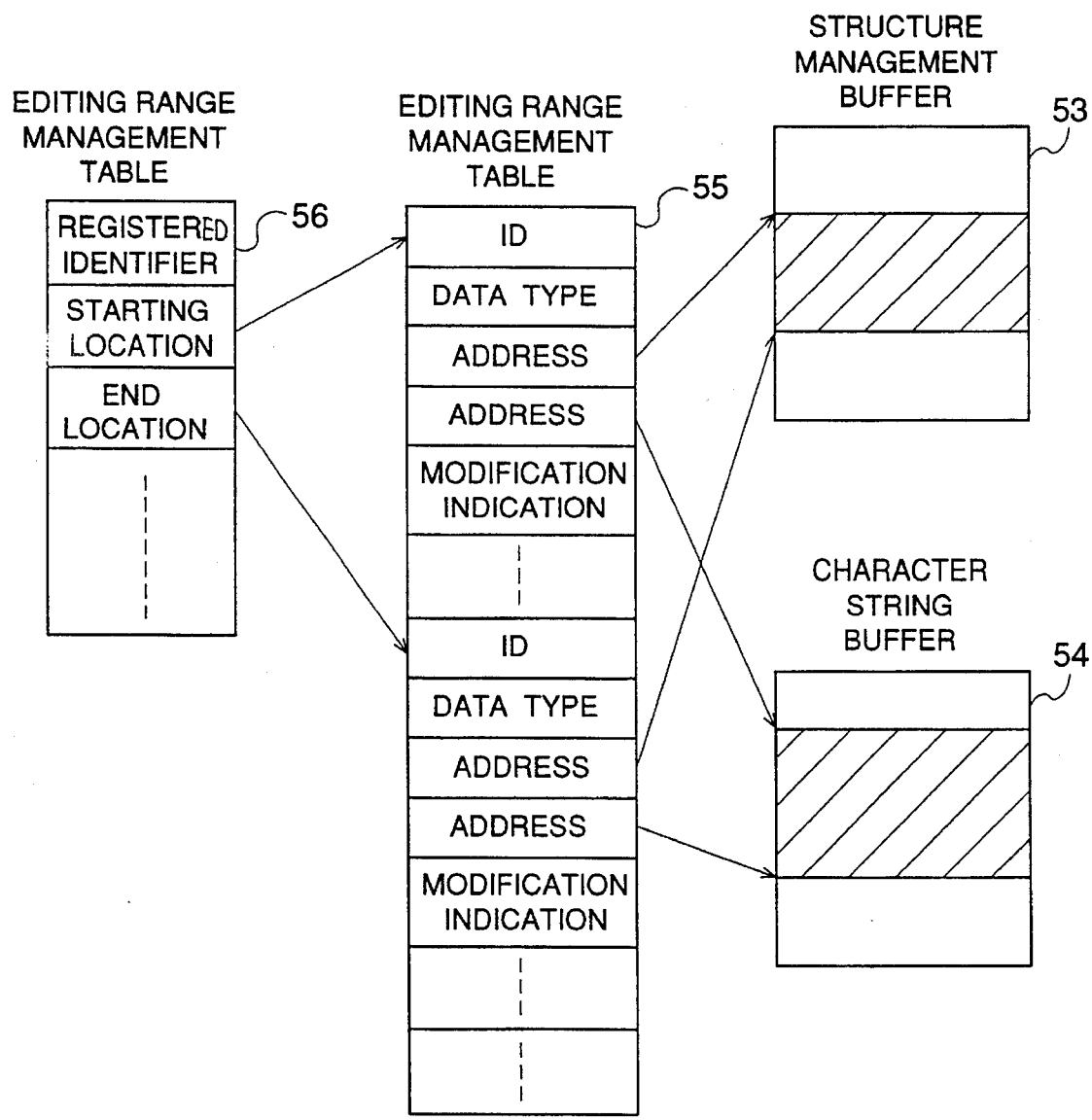
FIG. 18 is a diagram for explaining the relationship among an editing range management table, an editing management table and buffers in the editing device shown in FIG. 15.

In step S63, the edit control device 60 determines whether or not the editing management is completed. When it is determined that the editing management is not completed, the editing control device 60 performs an editing specification in which the editing range and registration identifier are specified in step S64. In step S65, the editing control device 60 determines whether the registered identifier has been specified. When the result in step S65 is negative, the process proceeds with step S63. When the result in step S65 is affirmative, the process proceeds with step S66. In step S66, the editing control device 60 registers the editing range and the registered identifier in the editing range management table 56, and step S63 is performed. The editing range in the editing range management table 56 is defined by the editing starting and ending locations in the editing management table 55. Hence, as shown in FIG. 18, one editing range is specified on the editing range management table 56, the editing management table 55 is referred to and shaded areas in the structure management buffer 53 and the character string buffer 54 are specified as editing ranges. An editor having the same editor identification number as the registered identifier can edit the editing ranges shown in FIG. 18.

Figure 19:
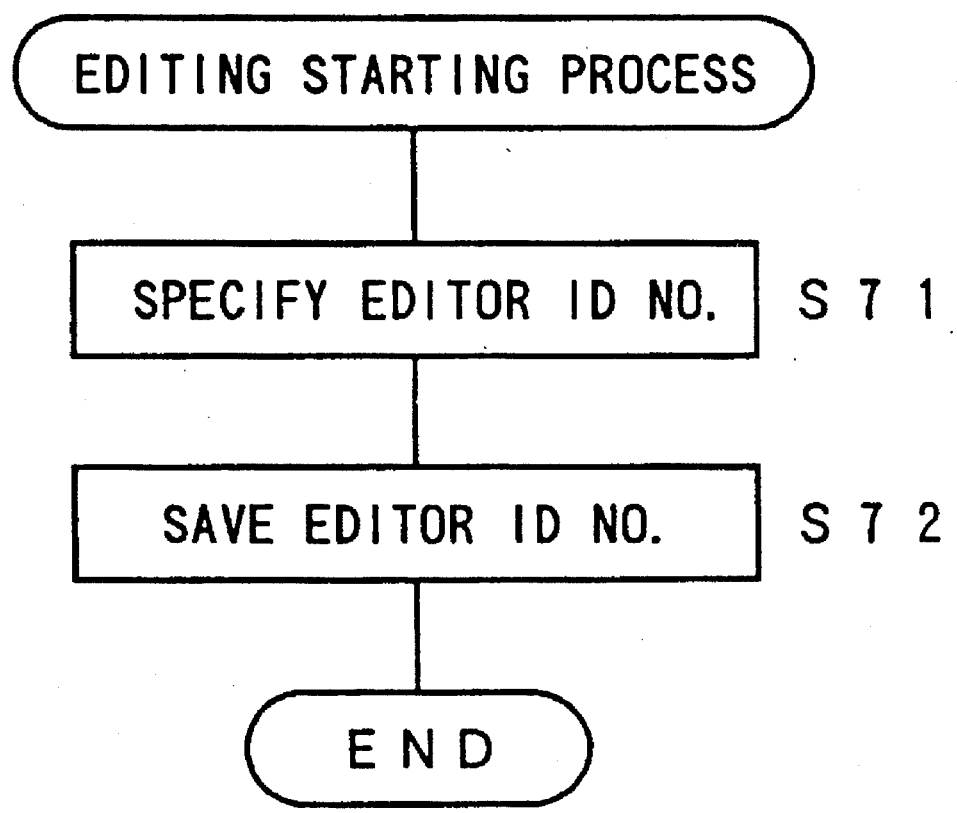
FIG. 19 is a flowchart of an editing starting process executed by the editing device shown in FIG. 15.

Each editor performs an editing starting process shown in FIG. 19 in advance of editing works. In step S71, the editor identification number is specified. In step S72, the above editor identification number (hereinafter referred to as a saved identifier) is saved. Then, the process shown in FIG. 19 is ended.

Figure 20:
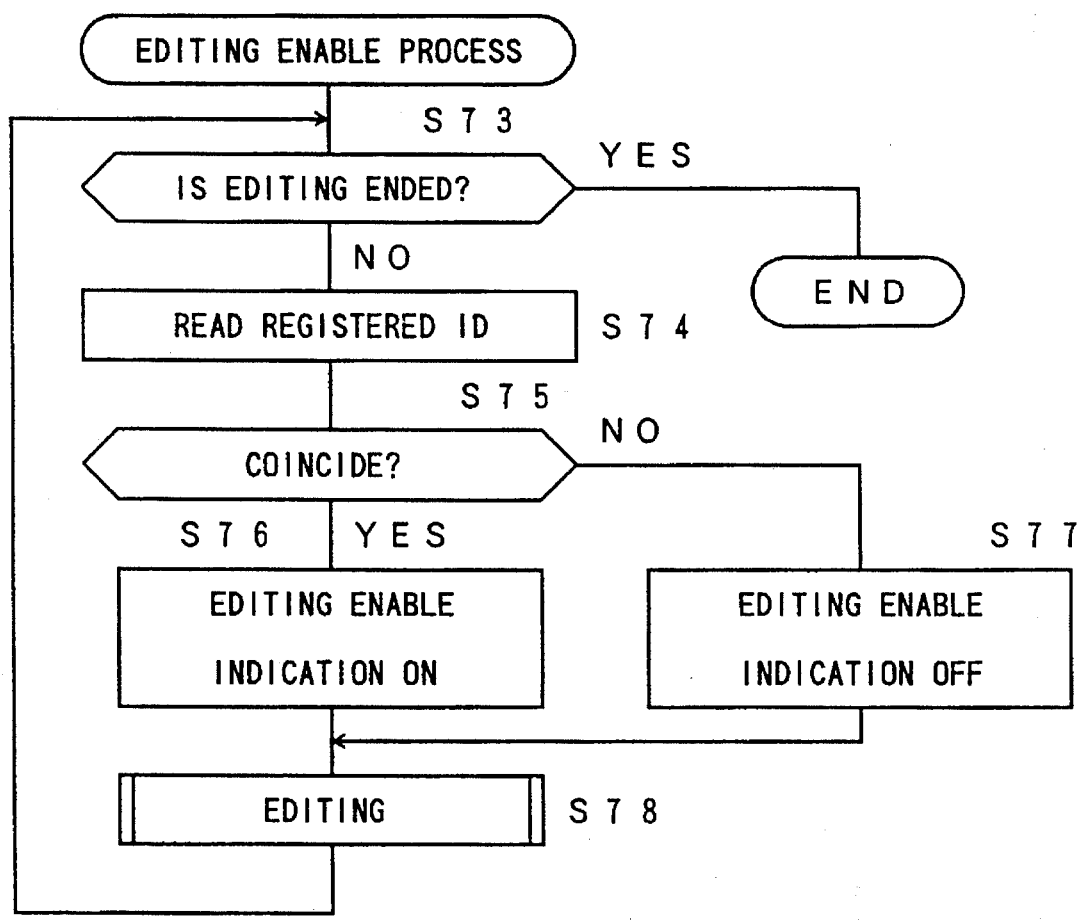
FIG. 20 is a flowchart of an editing enable process executed by the editing device shown in FIG.15.

FIG. 20 is a flowchart of an editing enabling process executed in the editing control device 60 by each editor. In step S73, the editing control device 60 determines whether or not the editing is completed. When it is determined that the editing is not completed, the process proceeds with step S74.

In step S74, the editing control device 60 reads, from the editing range management table 56, the registered identifier of the editing range related to an editing cursor displayed on the display unit 65. In step S75, the editing control device 60 determines whether or not the saved identifier saved in step S72 (shown in FIG. 19) matches the registered identifier. When the result of the above determination is YES, the editing control device 60 turns ON an editing enable display on the display device 65 in step S76. If the result of step S75 is NO, the process proceeds with step S77 in which the editing enable display on the display device 65 is turned OFF, whereby an editing process in step S78 is inhibited. After step S78 is executed, the process proceeds with step S73.

In the conventional editing device, there is a possibility that a document part other than a desired part for modification may be mistakenly modified and hence a document may be damaged. An improved editing device has been proposed which has a window function of repairing such an erroneous modification and a document backup function. However, if a document part is involuntarily or intentionally modified, the above functions do not work effectively. Further, the method of extracting a document part to be edited and modifying it has a problem in which the preceding and following document parts with respect to the extracted part cannot be easily read.

On the other hand, according to the present embodiment, when a number of editors concurrently edit a large-scale document, a number of editing blocks are specified in the document, and identifiers are assigned to the editing blocks in the management table so that the editing blocks can be identified one by one. Hence, the editors can share the editing blocks and separately edit the respective editing blocks thereof. At this time, editing of other editing blocks is inhibited. The editing blocks edited by the editors are unified so that one document is formed.

Figure 21:
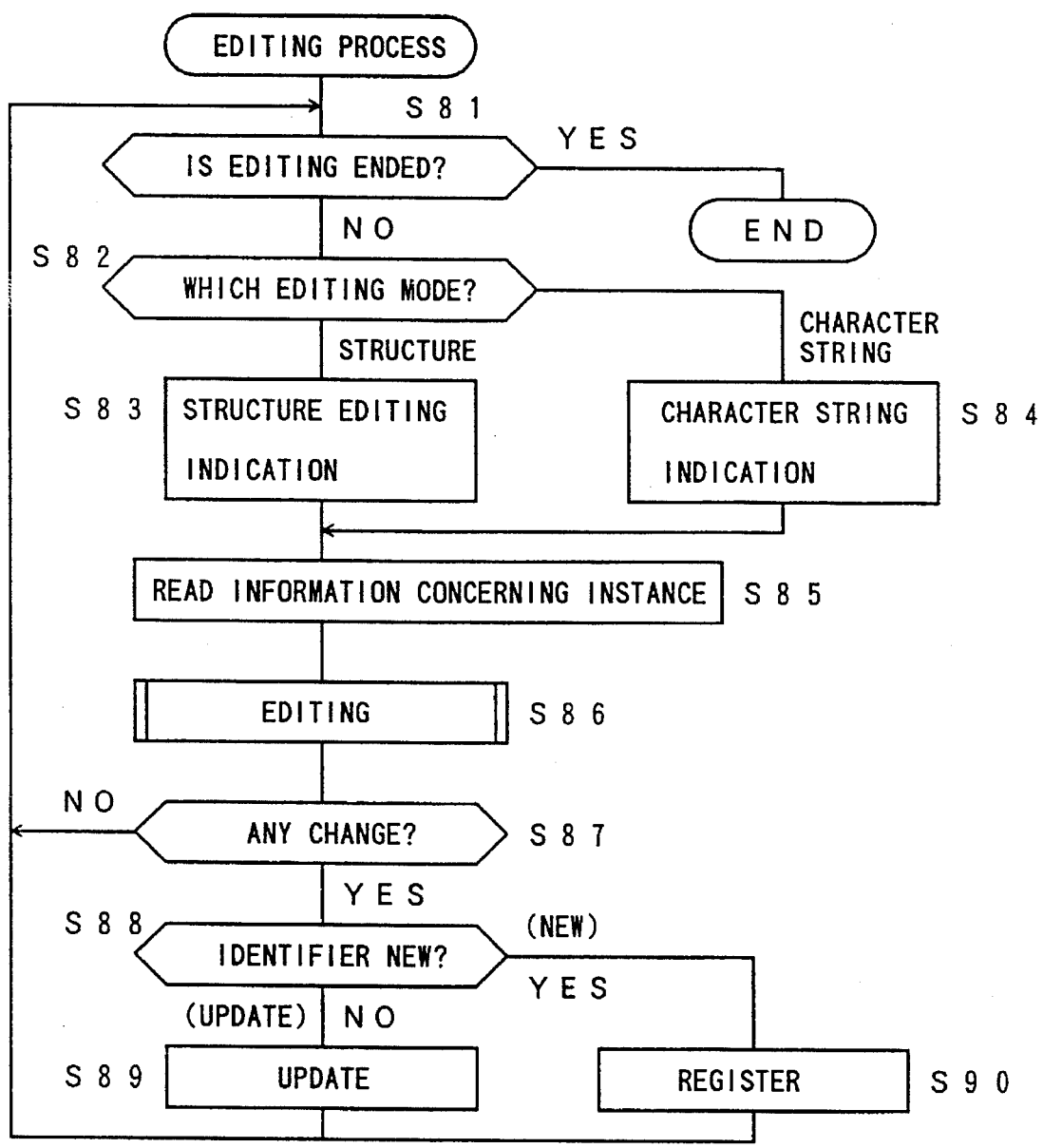
FIG. 21 is a flowchart of an editing process executed by the editing device shown in FIG. 15.

FIG. 21 is a flowchart of an editing process executed by the editing control device 60. In step S81, the editing control device 60 determines whether or not the editing is completed. When the editing is not completed, it is determined, in step S82, whether the editing mode specified by the switch 62 is editing of the structure type or the character string type. In the case of the structure type, the editing control device 60 causes the display unit 65 to display the structure editing indication in step S83. In the case of the character string type, the editing control device 60 causes the display unit 65 to display the character string editing indication in step S84.

In step S85, the editing control device 60 reads data from the structure management buffer 53 or the character string buffer 54. The data is read by the addresses which coincide with the specification of the above editing mode. The two possible addresses indicate the locations specified by the editing cursor on the display device 65 by referring to the editing management table 55. Then, the editing is performed in step S86.

In step S87, it is determined whether or not the edit data has been modified by the process in step S86. When it is determined that no modification has been performed, the process proceeds with step S81. When it is determined that a modification has been performed, it is determined whether or not the modification corresponds to the structure or character string of newly added data. The value of the identifier ID is a numerical value, which is positive for cases other than new edited data. Hence, it is possible to determine whether or not edited data is newly added data by referring to the sign of the value of the identifier ID.

When it is determined that the modification does not correspond to newly added data, the contents of the structure management buffer 53 or the character string buffer 54 indicated by the address of the location of concern in the editing management table 55 are updated with the edited data in step S89. Further, the modification indication in the editing management table 55 is updated, and the process proceeds with step S81.

When it is determined that the modification corresponds to newly added data, the identifier ID and the data type specified by editing and the write address of the structure management buffer 53 or the character string buffer 54 are written into a related area in the editing management table 55. Further, the edited data is written into an area of the structure management buffer 53 or the character string buffer 54 specified by the above write address, and the process proceeds with step S81.

In the above-mentioned manner, the document structure and the character string are independently edited via the editing management table 55. Hence, the character string can be edited without destroying the document structure during editing of the character string. Further, the document structure can be edited without destroying the character string during editing of the document structure.

By using the editing management table 55, it is possible to simultaneously display both the document structure and the character string on the display unit 65. On the editing screen at the time of editing a character string, the contents of the character string buffer 54 (read via the editing management table 55) are displayed. The editing location in the character string buffer 54 is specified by the location of the editing cursor on the editing screen, and the beginning address of the character string buffer 54 corresponding to the editing location is obtained. The beginning address is compared with the address of the character string buffer 54, and the address of the document structure corresponding to the character string address of the editing management table 55. The document structure is read by the related address of the structure management buffer 53, and the document structure is simultaneously displayed on the editing screen. Further, at the time of editing the document structure, a process reverse to the above is carried out so that both the document structure and the character string are displayed. By using the editing management table 55, both the document structure and the character string are displayed on the editing screen, and the character string and the document structure are alternately edited by switching the editing mode. The addresses of the buffers are alternately obtained via the editing management table 55, and one of the buffer addresses is selected in response to switching of the editing mode.

It is possible to edit the mutual relationship between the character string and the document structure by means of the editing management table 55. When a document structure is added or deleted, the contents of the character string buffer 54 are updated by adding a related character string buffer address to the editing management table 55 or deleting it therefrom. Simultaneously, related data is added to or deleted from the contents of the character string buffer 54. The result of the above editing is displayed on the editing screen.

The management of the version number based on the difference management is carried out by an editor as follows.

Figure 22B:
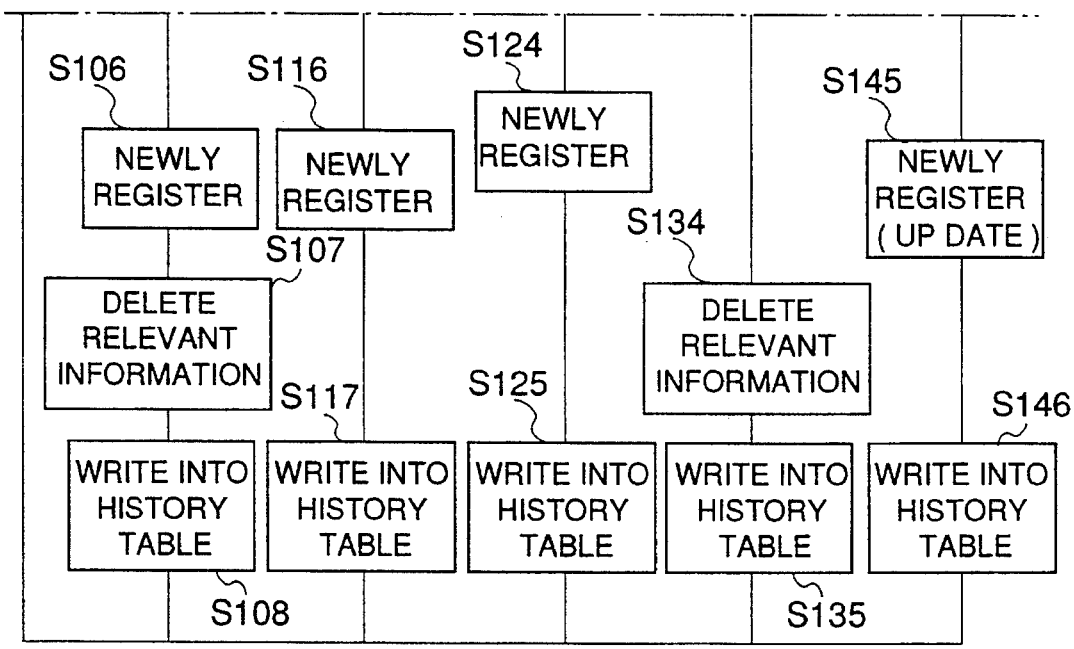

FIGS. 22A and 22B are flowcharts of a version number management process executed by the editing control device 60. In step S100, it is determined whether or not the editing is completed. When the editing is not completed, it is determined in step S101 which one of the movement, copy, addition, deletion or updating is specified as the mode by the switch 62.

When the movement mode is specified, the range to be moved (a source of movement) is specified in step S103, and a destination of the movement is specified in step S104. In step S105, related information concerning the source of the movement specified by the editing cursor, such as the identifier ID, data type, the structure data address and the character string address, is read from the editing management table 55. In step S106, the above related information is newly registered in the editing management table 55 as related information concerning the destination of the movement. In this case, the sign of the value of the identifier ID is set negative.

In step S107, the related information concerning the source of the movement is deleted from the editing management table 55. In step S108, a set of the editing mode and the related information concerning the source and destination of the movement is formed and written into the modification history table 57. Then the process proceeds with step S100.

When the copy mode is specified, the range to be copied is specified in step S113, and the destination of the copy is specified in S114. In step S115, related information concerning the source of the copy specified by the editing cursor, such as the identifier ID, data type, the structure data address and the character string address, is read from the editing management table 55. In step S106, the above related information is newly registered in the editing management table 55 as related information concerning the destination of the copy. In this case, the sign of the value of the identifier ID is set negative. Further, in step S117, a set of the editing mode and the related information concerning the source and destination of the copy is formed and written into the modification history table 57. Then the process proceeds with step S100.

When the adding mode is specified, added data is input in step S123. In step S124, related information concerning the added data, such as the identifier ID, data type, the structure data address and the character string address, is newly registered in the editing management table 55 as related information concerning the added data. In this case, the sign of the value of the identifier ID is set negative. Further, in step S125, the related information concerning the editing mode and the added data is written into the modification history table 57. Then the process proceeds with step S100.

When the deleting mode is specified, a range to be deleted is input in step S133. In step S134, related information concerning the deleted data, such as the identifier ID, data type, the structure data address and the character string address, is deleted from the editing management table 55. In step S135, the related information concerning the editing mode and the deleted data is written into the modification history table 57. Then the process proceeds with step S100.

When the updating mode is specified, data is updated in step S143. In step S144, related information concerning the updated data, such as the identifier ID, data type, the structure data address and the character string address, is read from the editing management table 55. In step S145, the related information after the updating, is written into the editing management table 55. At this time, the modification indication is turned ON.

Conventionally, the history management is realized by comparing the difference between the contents of the document before editing and the contents thereof after editing. Hence, in the copy mode, it is handled such that there is no modification in the source of the copy and data is added in the destination thereof. In the movement mode, it is handled that data is deleted from the source of the movement and is added in the destination thereof. Hence, it is impossible to discriminate the movement mode from the copy mode. On the other hand, according to the present invention, the editing management table 55 is accessed by means of the editing cursor at the time of editing. Hence, the identifier of the related buffer is always recognized and the result of the recognition is saved. In this manner, the history information concerning the modification of concern can be obtained. For example, when the content of the character string buffer having a certain identifier is copied or moved to the character string buffer having another identifier, the identifier of the copy source and the identifier of the copy destination are paired, and thereby the mutual relationship is saved. In this manner, history information concerning copy and movement can be obtained.

Figure 23:
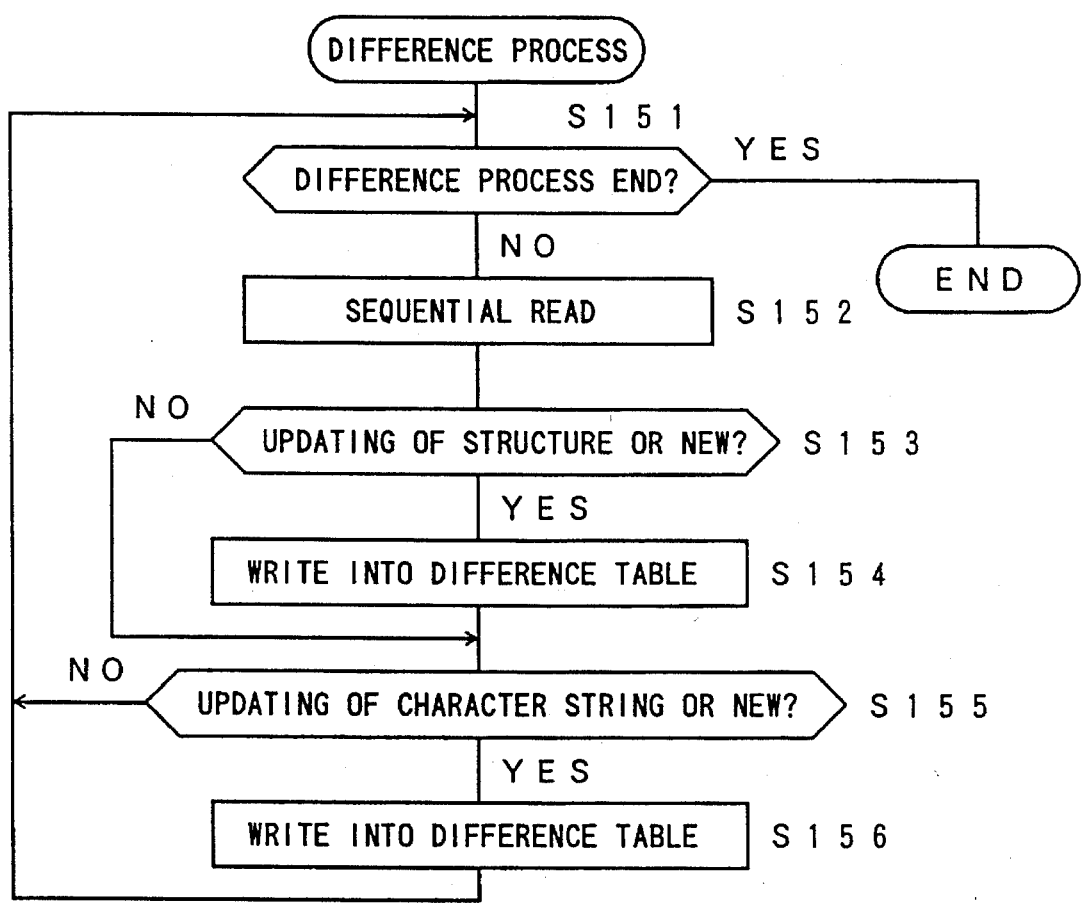
FIG. 23 is a flowchart of a difference process executed by the editing device shown in FIG. 15.

FIG. 23 is a flowchart of a difference process executed by the editing control device 60. In step S152, the contents of the editing management table 55 are read. In step S153, it is determined whether or not a modification indication occurred and whether updating or new registration of structure data occurred. Only when the updating or new registration occurred, in step S154 the identifier ID, the data type in the editing management table 55 and the structure data of the corresponding management buffer 53 are written into the difference table 58.

In step S155, it is determined whether not a modification indicating occurred and whether updating or new registration of character string data occurred. Only when updating or new registration of character string data occurred, in step S156 the identifier ID, the data type in the editing management table 55 and the character string data of the corresponding character string buffer 54 are written into the difference table 58. Then, the process proceeds with step S151.

Figure 24:
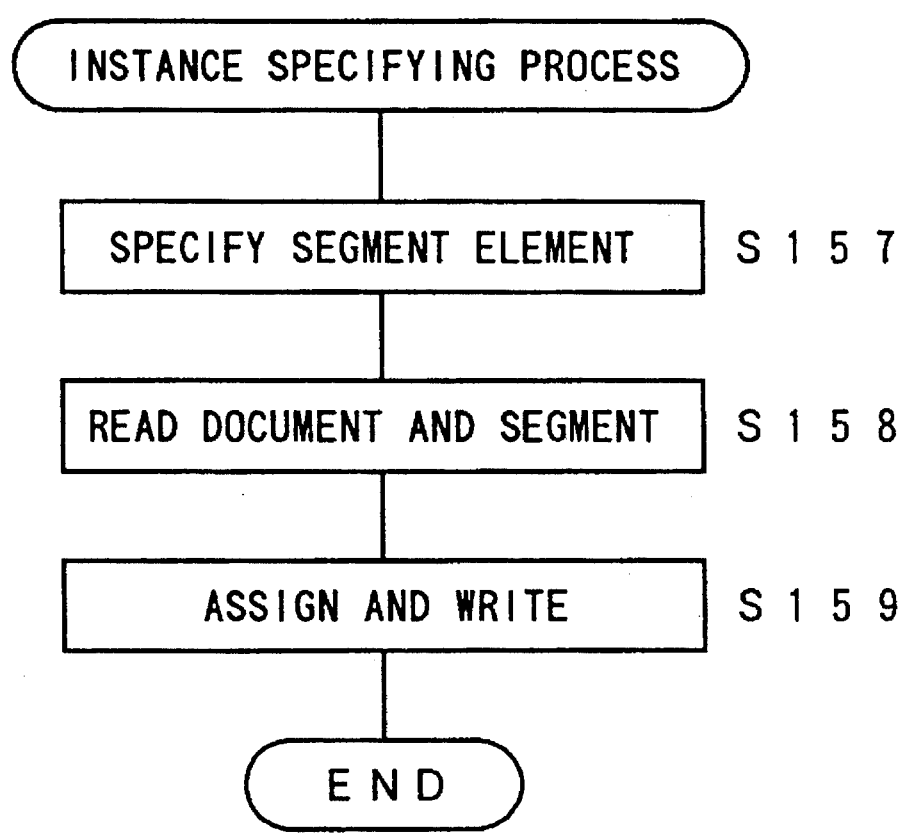
FIG. 24 is a flowchart of an instance specifying process executed by the editing device shown in FIG. 15.

FIG. 24 is a flowchart of an instance specifying process executed by the editing control device 60. In step S157, for example, a new-line symbol is specified as being a segment element. In step S158, a document is read and an instance of the character string type is segmented into a number of instances by the segment element. In step S159, each of the instances obtained by dividing the instance of the character string type is given an identifier ID and a data type, and is written into the character string buffer 54. Further, an instance of the structure type corresponding to each of the divided instances of the character string type, and is given an identifier ID and a data type. Then, the above instance with the identifier ID and the data type is written into the structure management buffer. In the above manner, writing of the new document is performed, and then the process is ended.

Figure 25:
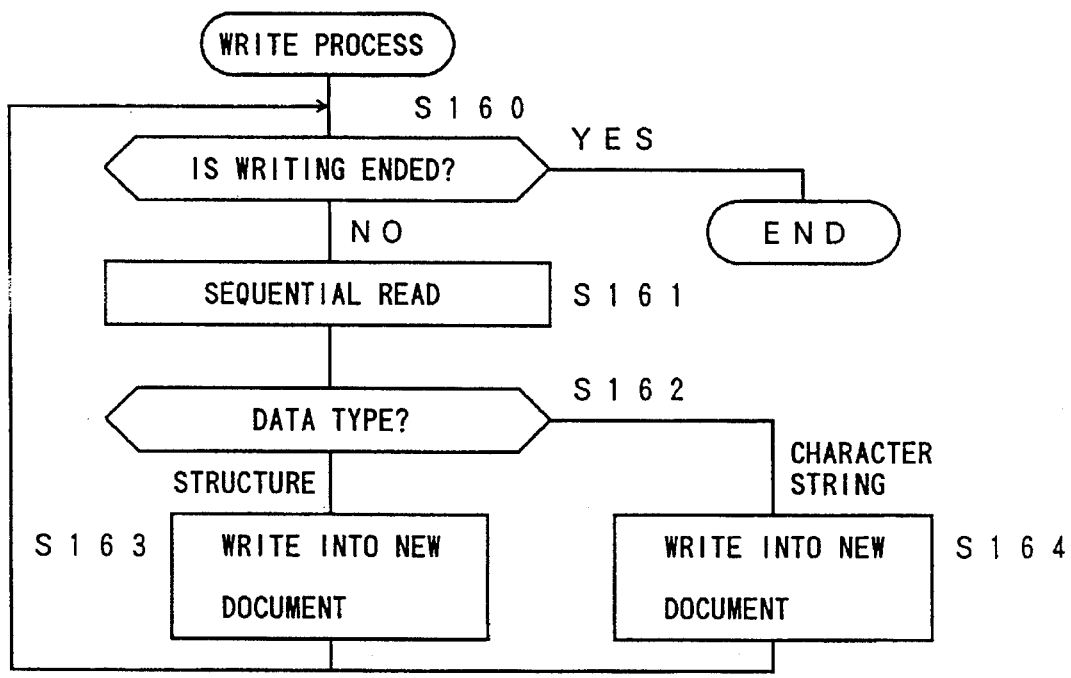
FIG. 25 is a flowchart of a write process executed by the editing device shown in FIG. 15.

FIG. 25 is a flowchart of a write process executed by the write unit 72. In step S160, the write unit 72 determines whether or not the writing is completed. When the result of the above determination is NO, the contents of the editing management table 55 are read in the instance unit.

In step S162, it is determined whether the data type is the structure or the character string. In the case of the structure type, in step S163, the instance is read from the structure management buffer 53 by using the address of the editing management table 55, and the identifier ID and the data type are added to the read instance, which is then written into the database 14 via the terminal 73 as a new document. Then, the process proceeds with step S160. In the case of the data string type, in step S164, the instance is read from the character string buffer 54 by using the address of the editing management table 55, and the identifier ID and the data type are added to the read character string, which is then written into the database 15b via the terminal 73 as a new document. Then, the process proceeds with step S160.

Figure 26:
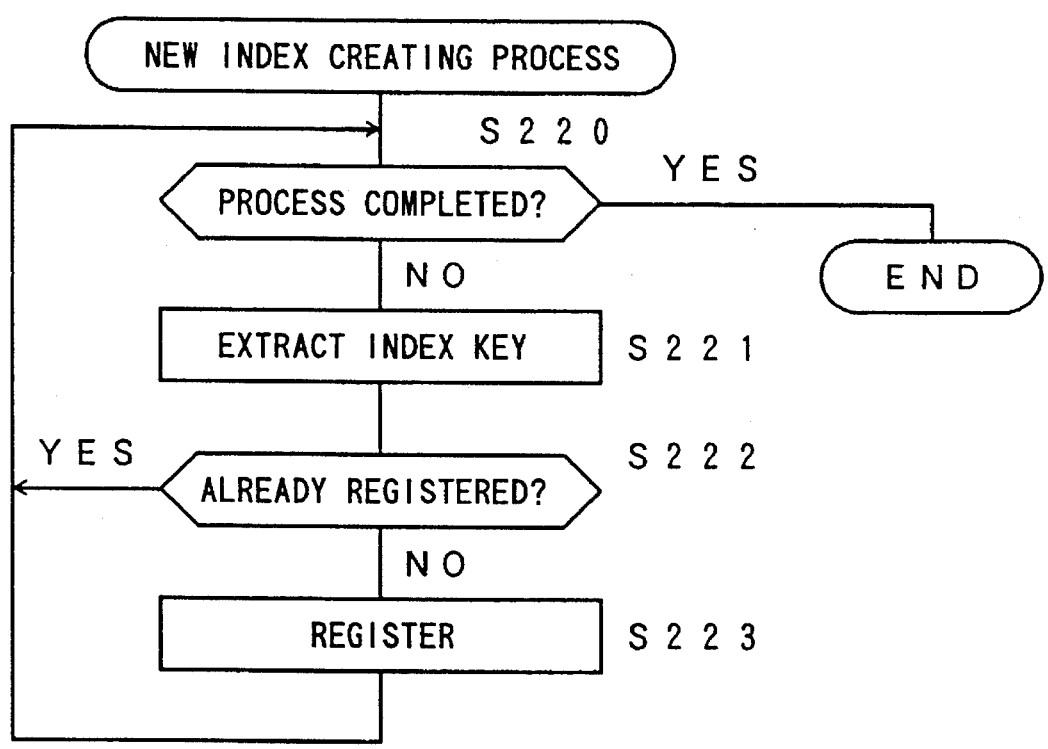
FIG. 26 is a flowchart of a new index creating process executed by the editing device shown in FIG. 15.
Figure 27A:
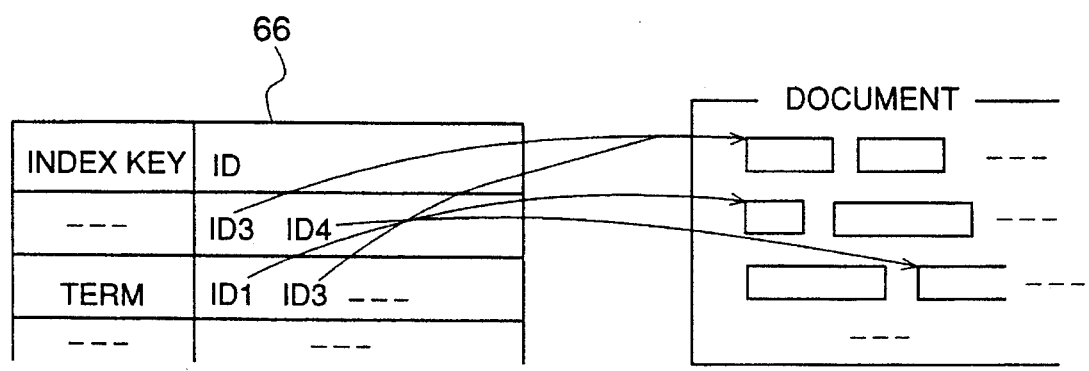
FIGS. 27A and 27B are sequential diagrams for explaining an index table used in the editing device shown in FIG. 15.

FIG. 26 is a flowchart of a new index creating process executed by the editing control device 60. In step S220, it is determined whether or not the process of the instance is completed. When it is determined that the process of the instance is not completed, a sequential index key is extracted from the above instance. In step S222, it is determined whether or not the index key extracted in step S222 has been registered in the index table. When it is determined in step S222 that the above index key has not been registered, the above index key and the identifier ID added to the instance are registered in the index table in step S223. Then, the process proceeds with step S220. In the above-mentioned process, an index table 66 in which the identifier ID of the instance related to the index key is registered as shown in FIG. 27A.

Figures 28, 28A:
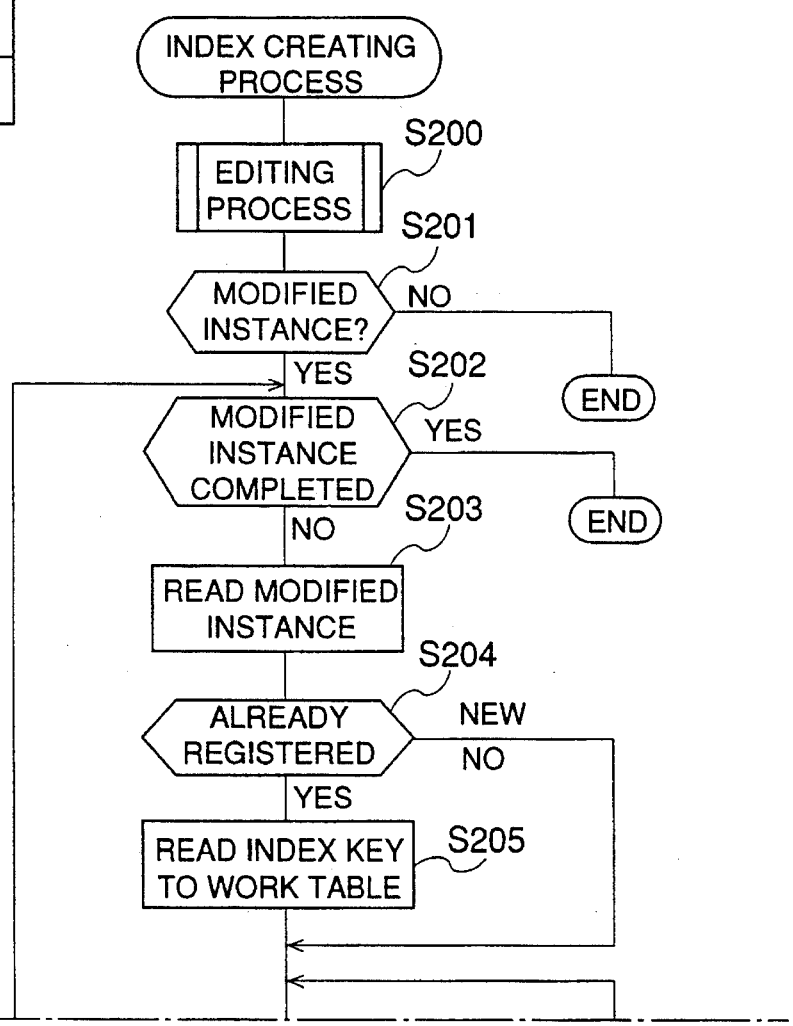
FIG. 28 is a block diagram showing how
FIGS. 28A and 28B are combined together.
Figure 28B:
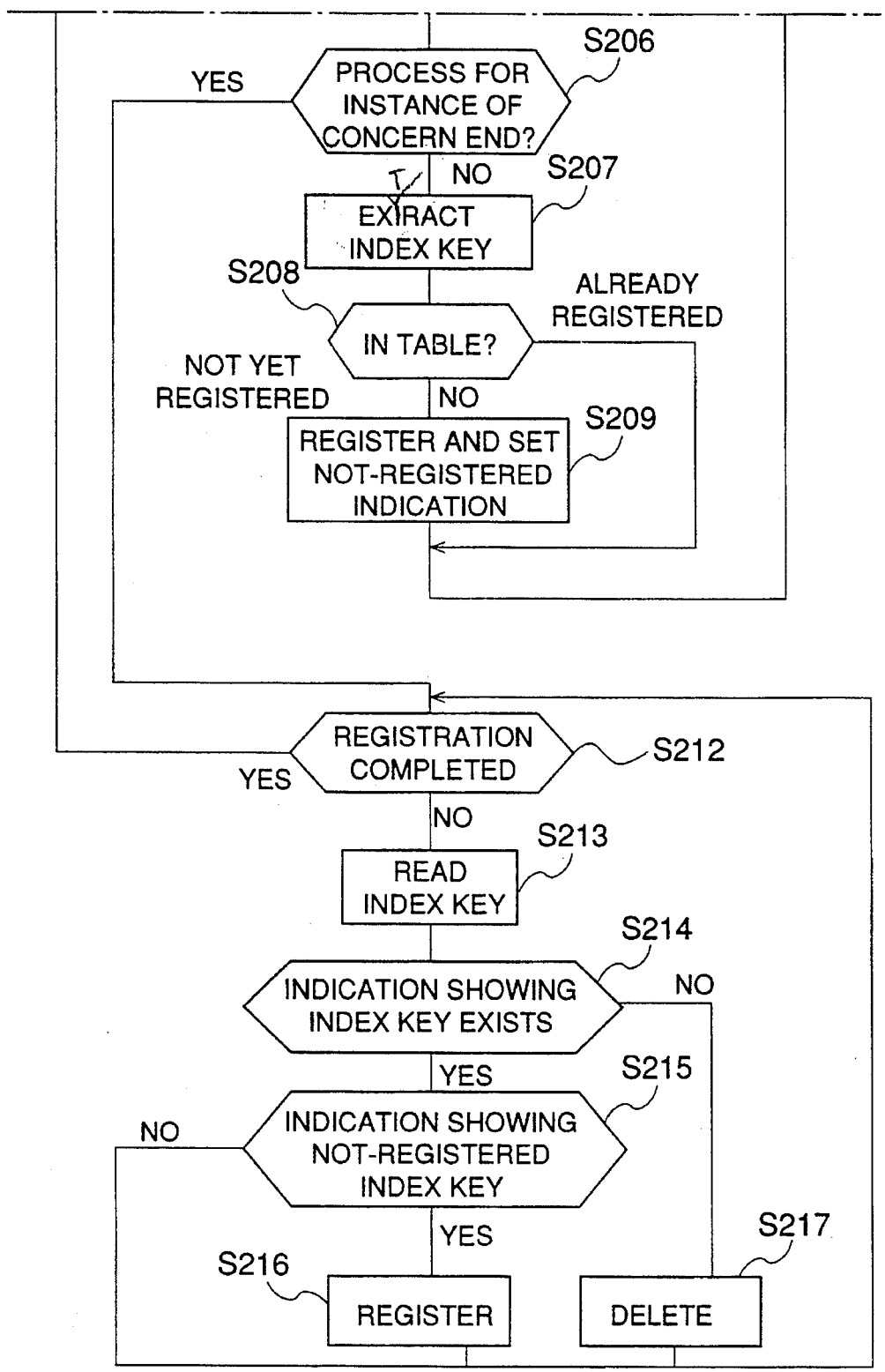

FIG. 28 is a flowchart of an index creating process executed by the editing control device 60. After the editing process is executed in step S200, it is determined, in step S201, whether or not there is a modified instance, that is, whether the difference table 58 has written information.

When there is a modification, it is determined, in step S202, whether or not the modified instance is completed. When there is a modified instance, the process proceeds with step S203.

In step S203, the modified instance is read from the edited document. In step S204, it is determined whether or not the modified instance read in step S203 has been registered in the index table 66. Only when the result of the above determination is affirmative, the index key of the instance of concern is read from the index table 66, and is written into a work table within the editing control device 60.

In step S206, it is determined whether or not the process for the instance of concern is completed. When the result of the above determination is NO, the sequential index key is read from the instance of concern in step S207. Then, it is determined, in step S208, whether or not there is the index key in the work table. Only when there is no index key in the work table, the index key is registered in the work table so as to indicate that the index key has not been registered in step S209. Thereafter, an indication indicating the existence of an index key is given to the index key of concern in the work table in step S210, and the process proceeds with step S206.

Figure 27B:
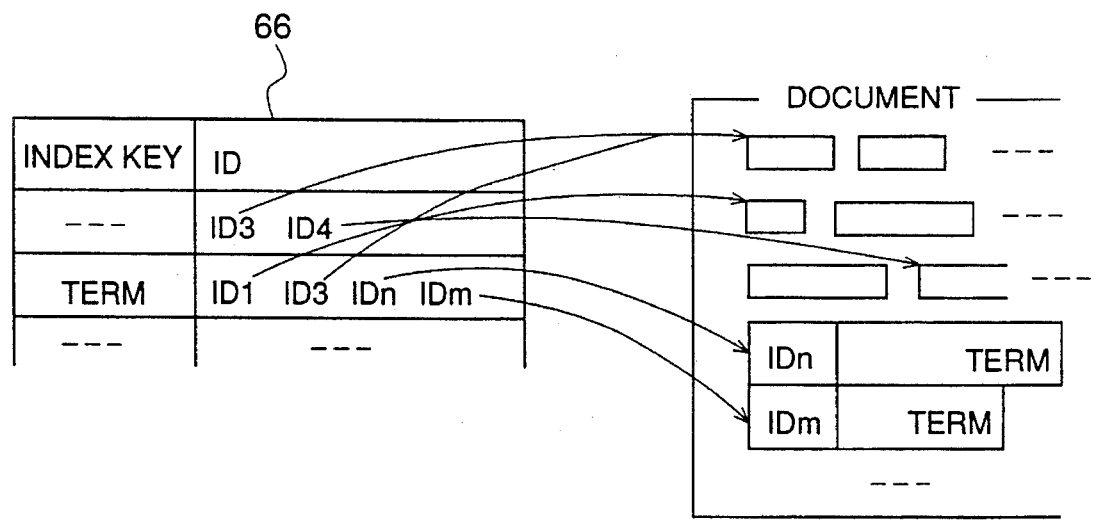

When the process for the instance of concern is completed in step S206, it is determined in step S212 whether or not the index registration is completed. When the index registration is not completed, index keys are successively read from the work table in step S213. Then, it is determined, in step S214, whether there is the indication indicating the presence of an index key with respect to the index key of concern. When the result of this determination is YES, it is determined, in step S215, whether or not there is an indication indicating that the index key has not been registered. Only when the result of the step S215 determination is YES, the index key of concern and the identifier ID added to the instance are registered in the index table. When it is determined, in step S215, that there is no index key indication, the index key of concern is deleted from the index table 66 in step S217. When there is no indication that the index key has not been registered, or when steps S16 and S217 are executed, the process proceeds with step S212. When it is determined that the index registration is completed, the process proceeds with step S202.

in the above-mentioned manner, as shown in FIG. 27B, the above identifiers IDn and IDm are registered in a column "term" in the index table 66 if there is a character string "term" in the modified instance (identifiers IDn and IDm).

Figure 29:
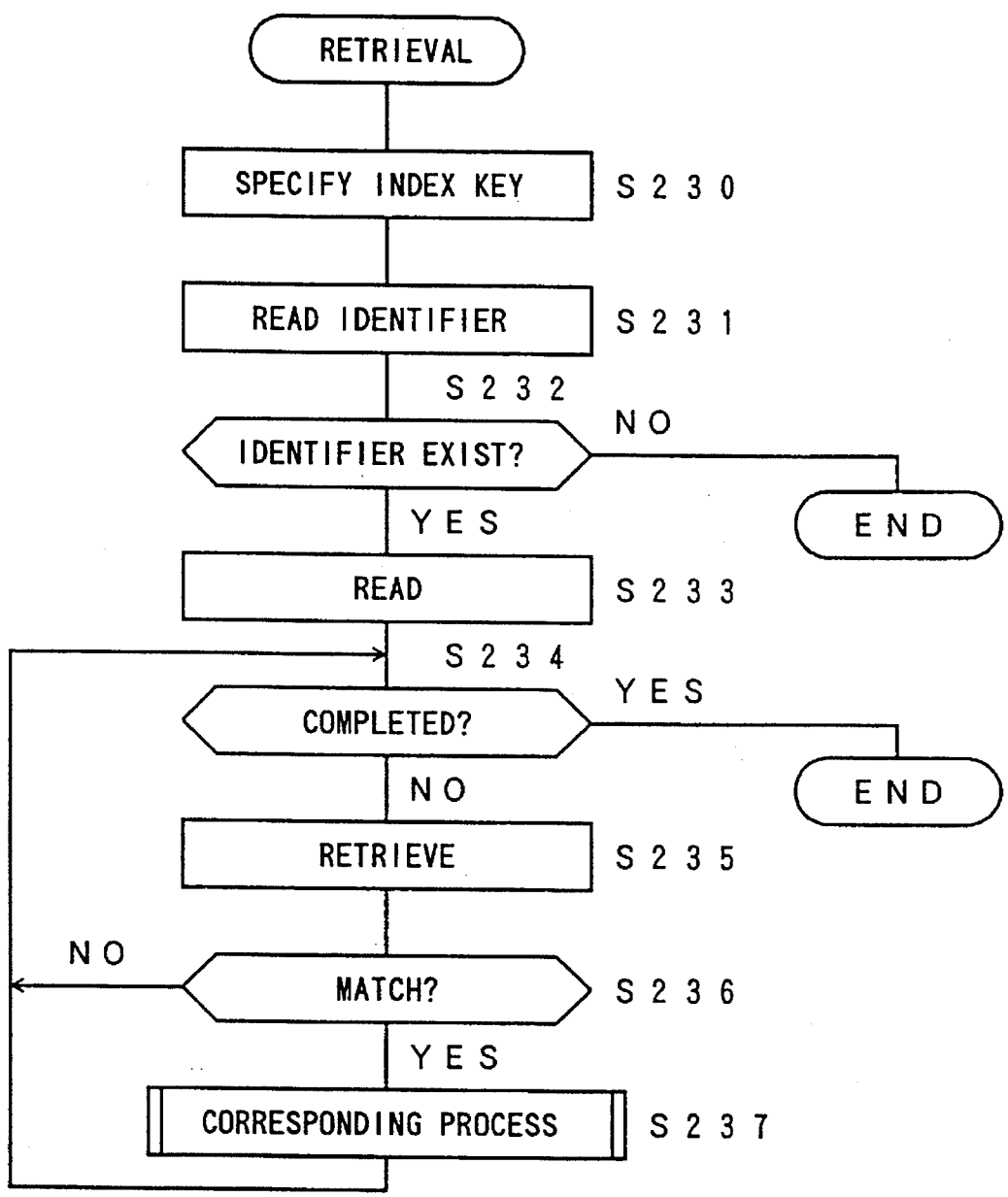
FIG. 29 is a flowchart of a retrieval process executed by the editing process shown in FIG. 15.

FIG. 29 is a flowchart of a retrieval process executed by the editing control device 60. In step S230, an index key is specified. In step S231, the identifier ID of the instance is read from the index table 66 by using the specified index key. In step S232, it is determined whether or not the identifier ID is read. When the result of this determination is YES, the instance of the above identifier ID is read from the document in step S233.

It is determined, in step S234, whether or not the retrieval is completed. When the retrieval is not completed, the contents of the instance read by means of the index key are retrieved in step S235. Then, it is determined, in step S236, whether or not there is anything related to the index key. Only when there is anything related to the index key, a desired corresponding process is performed. Then, the process proceeds with step S234.

As described above, in the retrieval, the identifier of the instance in the index table, and full text search is carried out for the instance of the retrieved identifier ID. Hence, the retrieval can be efficiently performed at higher speed.

The present invention is not limited to the specifically disclosed embodiments, and variations and modifications may be made without departing from the scope of the present invention.

What is claimed is:

1. A structured database system enabling a plurality of operators to share a structured document through a check-in or check-out of the structured document, said structured database system comprising:

a plurality of instances each defining an element of a structured document, wherein each instance is settable to an editable state and an edit inhibited state with respect to respective ones of a plurality of operators;

a plurality of edit blocks, each edit block storing a plurality of edit block pointers;

a plurality of storage blocks, each storage block storing a plurality of storage block pointers designating respectively corresponding instances of said plurality of instances and said plurality of edit block pointers, of each edit block, indicating connections to respectively corresponding storage blocks;

a plurality of storage blocks, each storage block storing a plurality of storage block pointers respectively associated with said plurality of instances and said edit block pointers indicating connections to a respectively corresponding storage blocks;

selecting means for selecting an edit block, of said plurality of edit blocks, in response to the check-in of the structured document by a first operator of said plurality of operators, thereby designating remaining operators of said plurality of operators, the plurality of edit block pointers of the selected edit block thereby indicating the connections to respectively corresponding storage blocks and the respectively associated plurality of instances;

means for setting the corresponding, selected instances to the editable state with respect to the first operator and to the edit inhibited state with respect to the remaining operators of the plurality of operators; and deselecting means for deselecting the selected edit block in response to a check-out of the structured document by the first operator, and for setting the corresponding, deselected instances to the editable state with respect to all operators.

2. The structured database system as claimed in claim 1, wherein each of the instances further comprises a control information and an information body.

3. The structured database system as claimed in claim 2, wherein the information body further comprises a character string of real information.

4. The structured database system as claimed in claim 2, wherein each of the plurality of instances further comprises means for indicating an external file for introduction into the structured document.

5. The structured database system as claimed in claim 4, wherein the external file further comprises a graphic image.

6. The structured database system as claimed in claim 4, wherein the external file further comprises a text file.

7. The structured database system as claimed in claim 4, wherein the external file further comprises a spreadsheet.

8. The structured database system as claimed in claim 2, wherein for each instance of the plurality of instances the control information further comprises:

a plurality of identifier IDs each corresponding to each instance for identifying the contents thereof, a plurality of numbers each corresponding to each of the plurality of instances for identifying version information of the contents of the instance; and a plurality of data-type identifiers for indicating whether the instance indicates the structure of a document or a character string of the document.

9. The structured database system as claimed in claim 8, wherein for each of the plurality of instances the control information further comprises:

a link destination for indicating the destination of the instance;

a link source for indicating the source of the instance; and a link attribute for denoting whether said link is a link destination or link source;

wherein the contents of the instance may be identified together with the control information.

10. The structured database system as claimed in claim 2, wherein for each instance of the plurality of instances the control information further comprises:

a link destination for indicating the destination of the instance;

a link source for indicating the source of the instance; and a link attribute for denoting whether said link is a link destination or link source;

wherein the contents of the instance may be identified together with the control information.

11. The structured database system as claimed in claim 9, wherein the contents of each instance are so arranged that the structure of the structured document and the instances of the document sequentially correspond.

12. The structured database system as claimed in claim 8, wherein the contents of each instance are so arranged that the structure of the structured document and the instances of the document sequentially correspond.

13. The structured database system as claimed in claim 2, wherein during check-in of the document, a first edit block, a first group of storage blocks corresponding thereto, and the contents of each instance are simultaneously checked in, said structured database system further comprising:

means for modifying the edit block into a modified edit block and comparing the modified edit block with the previously unmodified edit block before check-out of the data is performed.

14. The structured database system as claimed in claim 13, further comprising:

means for retaining the differences between the modified edit block and the previously unmodified edit block as an old edit block.

15. The structured database system as claimed in claim 13, further comprising:

means for forming the edit blocks in a version control table when viewed from a check-out destination, wherein said edit blocks are given from the first check-out destination to a second and a third check-out destination when the check-out operation is performed, thereby reflecting the progress of document development and version revision on the structured database system.

* * * * *

UNITED STATES PATENT AND TRADEMARK OFFICE
CERTIFICATE OF CORRECTION

PATENT NO. : 5,553,216

DATED : September 3, 1996

INVENTOR(S) : Makoto Yoshioka et al.

It is certified that error appears in the above-indentified patent and that said Letters Patent is hereby corrected as shown below:

Col. 2, line 35, after "structure" insert --may be--.

Col. 7, lines 7-8, delete "requires a particular remedy, i.e., program, for access" insert --dynamically create a table of contents for each--;

lines 57 , delete "each".

Col. 12, line 21, change "/" to --; --.

line 23, delete "l" after "check-out" insert --;--.

Signed and Sealed this

Fourth Day of March, 1997

*Attest:*

BRUCE LEHMAN

*Attesting Officer*     *Commissioner of Patents and Trademarks*